(12) United States Patent
Pande et al.

(10) Patent No.: US 9,373,960 B2
(45) Date of Patent: Jun. 21, 2016

(54) COMPUTERIZED SYSTEM AND METHOD FOR DISTRIBUTED ENERGY RESOURCE SCHEDULING

(71) Applicant: Oracle International Corporation, Redwood Shores, CA (US)

(72) Inventors: Shashank Arvind Pande, Maple Grove, MN (US); Ian Robert Dromey, Bloomington, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 461 days.

(21) Appl. No.: 13/799,385

(22) Filed: Mar. 13, 2013

(65) Prior Publication Data

US 2014/0277599 A1    Sep. 18, 2014

(51) Int. Cl.
*G05B 11/01*    (2006.01)
*G05D 11/00*    (2006.01)
(Continued)

(52) U.S. Cl.
CPC . *H02J 3/46* (2013.01); *G06Q 50/06* (2013.01); *H02J 3/008* (2013.01); *H02J 3/28* (2013.01); *H02J 3/30* (2013.01); *H02J 3/32* (2013.01); *H02J 3/381* (2013.01); *H02J 3/383* (2013.01); *H02J 3/386* (2013.01); *H02J 13/0062* (2013.01); *H02J 13/0079* (2013.01); *H02J 2003/003* (2013.01); *Y02B 70/3216* (2013.01); *Y02E 10/563* (2013.01); *Y02E 10/566* (2013.01); *Y02E 10/763* (2013.01); *Y02E 40/72* (2013.01); *Y02E 60/16* (2013.01); *Y02E 60/722* (2013.01); *Y02E 60/7838* (2013.01); *Y02E 70/30* (2013.01);
(Continued)

(58) Field of Classification Search
CPC .............. H02J 3/46; H02J 3/008; H02J 3/28; H02J 13/0079; H02J 3/386; H02J 3/381; H02J 13/0062; H02J 3/30; H02J 3/32; H02J 3/383; H02J 2003/003; G06Q 50/06
USPC .......................................... 700/22, 291, 295
See application file for complete search history.

(56) References Cited

U.S. PATENT DOCUMENTS 5,748,495 A  *  5/1998  Arita et al. ..................... 702/185
6,681,156 B1 *  1/2004  Weiss ............................. 700/291
(Continued)

OTHER PUBLICATIONS

Wikipedia Paticle Swarm, Feb. 24, 2013, 1 page.*
(Continued)

*Primary Examiner* — Robert Fennema
*Assistant Examiner* — Thomas Stevens

(57) ABSTRACT

The present disclosure provides for distributed resource scheduling performed by an advanced resource scheduling (ARS) module implemented on a distributed grid management (DGM) server in a power system. The ARS module is configured to automatically generate a resource schedule for controllable distributed energy resources (e.g., resources that are remotely controllable by DGM server and ARS module) in a distribution network of the power system, such as power generation resources and energy storage resources, to provide power in a cost-effective (e.g., optimal) manner. The ARS module is configured to take into account the operating limits of the distributed energy resources (DERs), the cost curves of the DERs, the system load demand, and other operating constraints to determine the most economical operating plan for the DERs, using an optimization technique such as the particle swarm optimization (PSO) algorithm.

16 Claims, 13 Drawing Sheets

(51) Int. Cl.

| | | |
|---|---|---|
| *H02J 3/46* | (2006.01) | |
| *G06Q 50/06* | (2012.01) | |
| *H02J 3/00* | (2006.01) | |
| *H02J 3/28* | (2006.01) | |
| *H02J 3/30* | (2006.01) | |
| *H02J 3/32* | (2006.01) | |
| *H02J 3/38* | (2006.01) | |
| *H02J 13/00* | (2006.01) | |

(52) U.S. Cl.
CPC ............... *Y04S10/12* (2013.01); *Y04S 10/123* (2013.01); *Y04S 10/14* (2013.01); *Y04S 10/54* (2013.01); *Y04S 20/221* (2013.01); *Y04S 40/124* (2013.01); *Y04S 50/10* (2013.01)

(56) References Cited

U.S. PATENT DOCUMENTS

| | | | | |
|---|---|---|---|---|
| 6,882,904 | B1* | 4/2005 | Petrie et al. | 700/295 |
| 7,706,928 | B1* | 4/2010 | Howell | G05B 19/0428 340/506 |
| 7,761,557 | B2* | 7/2010 | Fellenstein et al. | 709/224 |
| 7,844,370 | B2* | 11/2010 | Pollack et al. | 700/291 |
| 8,018,874 | B1* | 9/2011 | Owechko | 370/254 |
| 8,433,453 | B2* | 4/2013 | Tsunoda et al. | 700/297 |
| 2002/0029097 | A1* | 3/2002 | Pionzio et al. | 700/286 |
| 2002/0087234 | A1* | 7/2002 | Lof et al. | 700/286 |
| 2003/0009265 | A1* | 1/2003 | Edwin | 700/295 |
| 2003/0144932 | A1* | 7/2003 | Martin et al. | 705/32 |
| 2004/0085562 | A1* | 5/2004 | Fromherz | 358/1.13 |
| 2005/0009578 | A1* | 1/2005 | Liu | 455/574 |
| 2005/0165511 | A1* | 7/2005 | Fairlie | 700/286 |
| 2006/0206240 | A1* | 9/2006 | Tsui | 700/291 |
| 2007/0001461 | A1* | 1/2007 | Hopewell | 290/44 |
| 2007/0198223 | A1* | 8/2007 | Ella et al. | 702/188 |
| 2008/0224892 | A1* | 9/2008 | Bogolea et al. | 340/870.3 |
| 2009/0062969 | A1* | 3/2009 | Chandra et al. | 700/291 |
| 2010/0280673 | A1* | 11/2010 | Woste | 700/287 |
| 2011/0020122 | A1* | 1/2011 | Parthasarathy et al. | 416/61 |
| 2011/0029141 | A1* | 2/2011 | Sun et al. | 700/291 |
| 2011/0066300 | A1* | 3/2011 | Tyagi | H02J 3/14 700/291 |
| 2011/0257800 | A1* | 10/2011 | Al-Hamouz et al. | 700/287 |
| 2012/0004783 | A1* | 1/2012 | Lo et al. | 700/291 |
| 2012/0029720 | A1* | 2/2012 | Cherian et al. | 700/297 |
| 2012/0083933 | A1* | 4/2012 | Subbu et al. | 700/291 |
| 2012/0139351 | A1* | 6/2012 | Wang | 307/82 |
| 2013/0144451 | A1* | 6/2013 | Kumar et al. | 700/291 |
| 2013/0155048 | A1* | 6/2013 | Swamy | 345/419 |

OTHER PUBLICATIONS

Chen et al., "Task Scheduling in Grid Based on Particle Swarm Optimiztion", 2006, The Computer Society, 8 pages.*

Shi et al., "A Modified Particle Swarm Optimizer", 1998, IEEE, pp. 69-73.*

T. O. Ting et al., "A Novel Approach for Unit Commitment Problem via an Effective Hybrid Particle Swarm Optimization," IEEE Transactions on Power Systems, vol. 21, No. 1, Feb. 2006, pp. 411-418.

* cited by examiner

Figure 6A

| Iterations for a single time interval 610(1)-(n) | | | | | | | |
|---|---|---|---|---|---|---|---|
| n | $a_n$ | $b_n$ | $c_n$ | ... | $y_n$ | $z_n$ | Positions 640(n) |
| n-1 | $a_{n-1}$ | $b_{n-1}$ | $c_{n-1}$ | ... | $y_{n-1}$ | $z_{n-1}$ | |
| ⋮ | ⋮ | ⋮ | ⋮ | | ⋮ | ⋮ | ⋮ |
| 3 | $a_3$ | $b_3$ | $c_3$ | ... | $y_3$ | $z_3$ | |
| 2 | $a_2$ | $b_2$ | $c_2$ | ... | $y_2$ | $z_2$ | |
| 1 | $a_1$ | $b_1$ | $c_1$ | ... | $y_1$ | $z_1$ | Positions 640(1) |
| init | $a_0$ | $b_0$ | $c_0$ | ... | $y_0$ | $z_0$ | Positions 640(0) |
| | 1 | 2 | 3 | ... | p-1 | p | |

Particles 620(1)-(p) of Swarm 630

COMPUTERIZED SYSTEM AND METHOD FOR DISTRIBUTED ENERGY RESOURCE SCHEDULING

FIELD OF THE INVENTION

The present invention relates to power systems, and more particularly, to resource scheduling.

BACKGROUND OF THE INVENTION

Meeting energy (or power) demands of customers in a cost-effective way is an age-old problem in the energy utility industry. Traditionally, power has been supplied by bulk generation, where centrally-located power plants provide power through a transmission system to a distribution grid that provides power to end customers. As customers' power demands have evolved and existing systems have aged, additional pressures have been placed on such a traditional bulk generation scheme. For example, a bulk generation power system may be required to meet some quality of service (e.g., power quality, continuity of power, and/or voltage stability), which in turn may require upgrades to be made to a large portion of the bulk generation power system's infrastructure. Such upgrades can be quite expensive.

A modern approach to meeting power demand is distributed generation, where smaller non-centralized energy sources provide power to the distribution grid. With the advancement in various technologies, distributed generation has become a viable and cost effective option to deal with issues like quality of service, which avoids the difficulties in upgrading the infrastructure required by bulk generation. A different set of needs are placed on a distributed generation approach, such as generation scheduling. Since multiple non-centralized energy sources provide energy (or power) to the distribution grid, such energy sources need to be optimally scheduled to produce enough power to meet customer demand in a cost-effective manner. For example, the costs involved in power generation at a first energy source may be more expensive than at a second energy source, and thus the first energy source may be scheduled to generate a limited amount of power in order to save costs.

Optimal scheduling of energy sources is challenging, especially considering that a standard for scheduling, managing, and operating energy sources does not presently exist. Conventional scheduling optimization techniques include "Dynamic Programming" and "Lagrange Relaxation." However, such conventional techniques are computationally demanding, as well as difficult to implement and test. Further, non-centralized energy sources can be quite varied and non-standard in their capabilities and restrictions, which makes the application of such conventional techniques even more difficult.

SUMMARY OF THE INVENTION

The present disclosure provides for distributed resource scheduling performed by an advanced resource scheduling (ARS) module implemented on a distributed grid management (DGM) server in a power system. Customers place a power demand or required load on a distribution network of a power system for a certain amount of power (e.g., electrical power or electricity). Distributed energy resources (DERs) are configured to provide, in aggregate, enough power output to meet or satisfy the power demand. Each DER is configured to perform its energy function (e.g., generating power or storing the generated power as energy that can be later provided to the distribution network) at some operating cost (e.g., cost of fuel to perform its energy delivery function). Thus, a combination of DERs is desired to be selected that provides enough power output to meet or satisfy power demand while keeping operating costs minimal. The ARS module is configured to schedule controllable distributed energy resources (e.g., resources that are remotely controllable by the DGM server and ARS module) in the distribution network, such as generation resources and storage resources, to provide power in a cost-effective (e.g., optimal) manner. The ARS module is configured to take into account the operating limits of the distributed energy resources (DERs), the cost characteristics of the DERs, the system load demand, and other operating constraints to determine the most economical operating plan for the DERs. In one embodiment, the ARS module uses an optimization technique such as the particle swarm optimization (PSO) algorithm.

BRIEF DESCRIPTION OF THE DRAWINGS

The present invention may be better understood, and its numerous objects, features and advantages made apparent to those skilled in the art by referencing the accompanying drawings.

FIGS. 6A and 6B are simplified block diagrams illustrating components of the relationship between swarms, particles, and time intervals, according to one embodiment.

Figure 1:
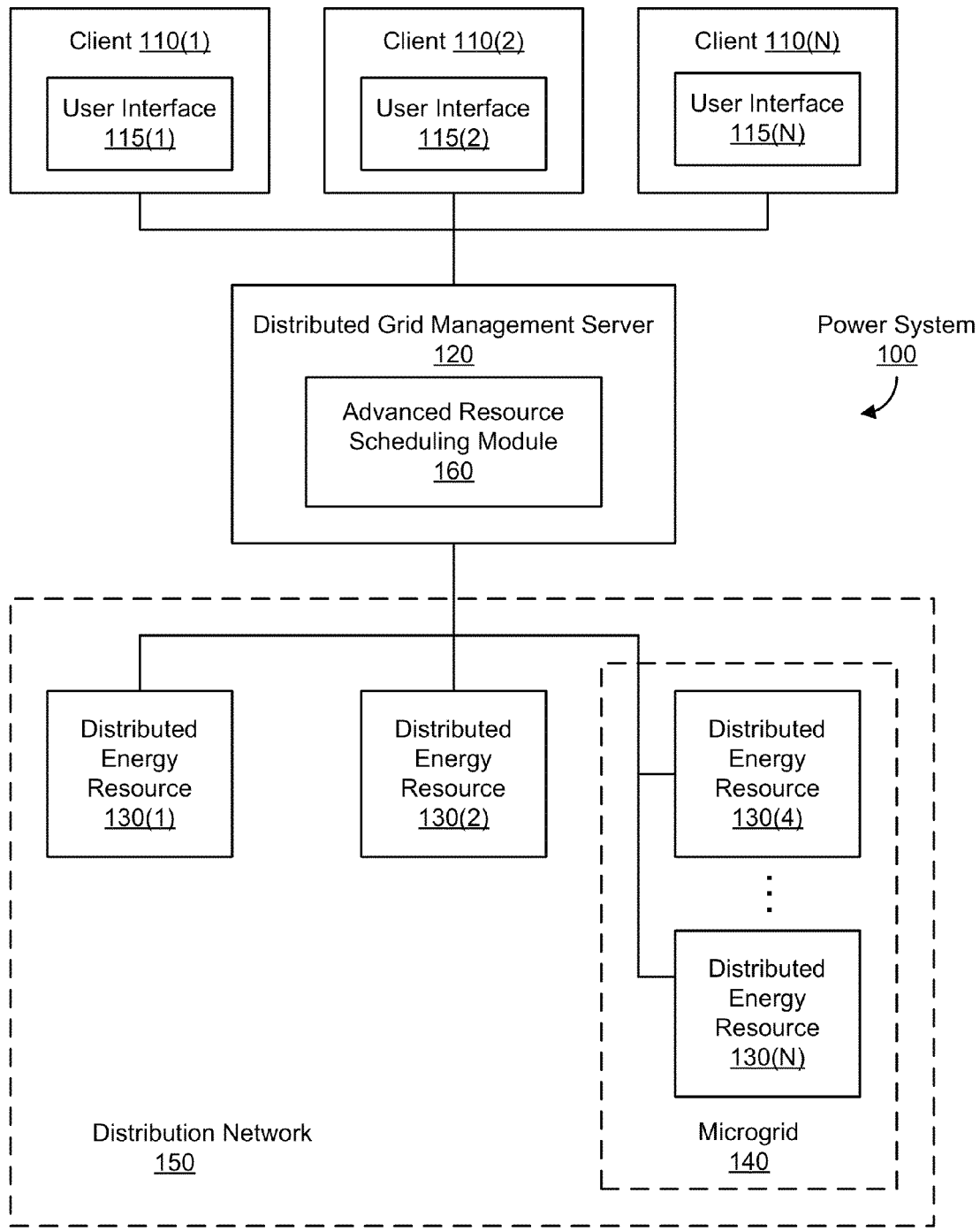
FIG. 1 is a simplified block diagram illustrating components of an example power system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Generation scheduling for non-centralized energy resources (also referred to herein as distributed energy resources, or DERs) in a distributed generation power system (also referred to herein as a distribution system) has become more complex due to increasing distributed generation. Due to the mix of various distributed energy resources that may be implemented in the distribution system, "resource scheduling" or "distributed resource scheduling" (rather than generation scheduling) is used herein, and refers to optimally scheduling distributed energy resources for power generation (e.g., generators) and/or energy storage (e.g., batteries). Examples of generation resources include diesel generators, bio-fuel operated generation resources, small gas turbines, solar panels, wind turbines, and the like. Examples of storage resources include batteries, flywheels, superconducting magnetic energy storage, uninterrupted power supply, and the like.

Distributed resource scheduling is discussed herein as a problem that an optimization technique solves. The distributed resource scheduling problem is a mixed integer non-linear problem with constraints, which means that the distributed resource scheduling problem involves the determination of an integer (e.g., on/off status of a resource) and real variables (e.g., output of the resource), and the objective of the optimization technique involves non-linear equations of these variables. The on/off status and output are also subject to constraints, such as:

(i) if a resource is turned on, it stays on for x time period;
(ii) if a resource is turned off, it stays off for y time period;
(iii) the output of the resource is between specified minimum and maximum limits; and
(iv) the total output of all resources is equal to the load demand.

The distributed resource scheduling problem is theoretically difficult to solve. The solution of the problem involves two parts: (a) determining a combination of resources that have been selected to supply the desired load, where the selected resources have an online status (also referred to herein as the resource commitment problem); and (b) determining the output of each selected resource (also referred to herein as the economic load dispatch problem). The two parts can be solved separately, which essentially requires two algorithms embedded in one larger algorithm package. The present disclosure provides for solving both parts simultaneously by determining the output of the resources, and then deriving the statuses from the output (e.g., power output below a threshold indicates offline status of the resource, while power output greater than or equal to the threshold indicates online status of the resource). Thus, only one algorithm is required. In one embodiment, distributed resource scheduling includes optimized scheduling of both generation resources and storage resources (e.g., co-optimization).

Nature-inspired artificial intelligence-based algorithms tend to be good candidates for solving the distributed resource scheduling problem, especially since conventional optimization methods are difficult to apply to distributed energy resources that have varied characteristics and a variety of constraints. One example of a nature-inspired algorithm is the "Particle Swarm Optimization Algorithm" (also referred to herein as PSO algorithm or PSO optimization technique). The PSO optimization technique is easier to implement than many conventional optimization methods, and demands relatively less computational power than conventional optimization methods. The present disclosure provides for solving the economic load dispatch problem using the PSO algorithm as the optimization technique. In other embodiments, different algorithms can be used as the optimization technique.

The present disclosure describes embodiments of distributed resource scheduling performed by an advanced resource scheduling (ARS) module implemented, for example, on a distributed grid management (DGM) server in a power system. In such a system, the ARS module is configured to automatically generate a resource schedule for controllable distributed energy resources (e.g., resources that are remotely controllable by the DGM server and ARS module) in a distribution network of the power system, such as generation resources and storage resources, to provide power to the distribution network in a cost-effective (e.g., optimal) manner. Such an ARS module is configured to take into account the operating limits of the distributed energy resources (DERs), the cost profiles of the DERs, the system load demand, and other operating constraints to determine the most economical operating plan for the DERs, using an optimization technique such as the particle swarm optimization (PSO) algorithm. An economical (e.g., optimized) resource schedule or operating plan indicates a power output of each of the DERs that satisfies power demand while minimizing operating costs.

FIG. 1 is a simplified block diagram illustrating components of an example power system 100 in which the present disclosure can be implemented. Power system 100 includes one or more client systems 110(1)-(N) that are communicatively coupled to a distributed grid management server 120, which in turn is communicatively coupled to one or more distributed energy resources 130(1)-(N) in a distribution network 150. One or more distributed energy resources 130 can be included in a microgrid 140, which is a localized grouping of distributed energy resources that is connected to a larger grid in distribution network 150.

One or more client systems 110(1)-(N), also referred to collectively herein as client devices 110 and/or clients 110, can each be implemented using, for example, a desktop computer, a laptop computer, a workstation, a server, or the like. An example of one such computing device is described subsequently, in connection with FIG. 10. One or more clients 110(1)-(N) are communicatively coupled with distributed grid management server 120, such as via a communications network. Examples of a communications network include a dedicated communication line, a local area network (LAN) utilizing Ethernet, IEEE 802.11x, or some other communications protocol, and a wide area network (WAN) like the internet. Client systems 110(1)-(N) also respectively implement a user interface 115(1)-(N), which is configured to communicate with distributed grid management server 120 (e.g., with advanced resource scheduling module 160), such as by sending user input to distributed grid management server 120 via the communications network and receiving output from distributed grid management server 120 via the communications network. User interface 115(1)-(N) can be a command line interface that is configured to receive commands (e.g., text strings) from a user. User interface 115(1)-(N) can also be a graphical user interface that is configured to implement or display graphical elements (e.g., visual images, icons, buttons, pointers, etc.) with which a user can interact to provide user input and/or to view a display of distributed grid management server output.

Distributed grid management (DGM) server 120 can include one or more physical servers configured to perform a variety of tasks related to management and utilization of distributed energy resources 130(1)-(N) for power system 100. An example computing device that can be used to implement DGM server 120 is described subsequently, in connection with FIG. 10. DGM server 120 is configured to control resources within a portion of the distribution network, also referred to herein as the DGM area. Additional non-controllable resources may also exist within the DGM area, further discussed below in connection with participating and non-participating resources.

Distribution network 150 is an interconnected network, or electrical grid, for delivering electricity from distributed energy resources 130(1)-(N) to customers. Distribution network 150 can include one or more microgrids 140. Although not shown, distribution network 150 can include high capacity transmission lines for carrying large amounts of power from distributed energy resources to one or more distribution centers, switches for routing power through distribution network 150, transformers for stepping down (e.g., reducing) the voltage in order to convey power on smaller capacity distributions lines that carry power to customers, and regulators that regulate voltage to avoid over- or under-voltage conditions.

Distributed energy resources 130(1)-(N), also referred to herein as DERs or simply resources, are devices that include generation resources (e.g., generates and provides electrical power to distribution network 150) and storage resources (e.g., stores electrical power as energy and can provide electrical power to distribution network 150 at some time). Each DER is coupled to distribution network 150 via one or more distribution lines, and provides its electrical power (outputs generated power or outputs power from stored energy) to distribution network 150. Each DER is communicatively coupled with distributed grid management server 120, such as via a communications network. Examples of such a communications network include a dedicated communication line, a local area network (LAN) utilizing Ethernet, IEEE 802.11x, or some other communications protocol, and a wide area network (WAN) like the Internet.

The present disclosure is implemented in an advanced resource scheduling (ARS) module 160, which is implemented on distributed grid management server 120. Customers place a demand or load on distribution network 150 for a certain amount of power. DERs 130 are configured to provide, in aggregate, enough power to meet customer demand. However, each DER is configured to perform its energy function (e.g., generating electrical power or storing energy) at some operating cost (e.g., cost of fuel to perform its energy function). Thus, a combination of DERs is desired to be selected that provides enough electrical power to meet customer demand while keeping operating costs minimal. Since customer demand can change over time (e.g., through the course of a day), such a combination of DERs and DER output can also change over time to meet the customer demand. ARS module 160 is configured to determine a distributed resource schedule that schedules a set of DERs to meet the anticipated load at minimum cost, which is also referred to herein as the distributed resource scheduling problem. ARS module 160 is discussed in further detail below in connection with FIG. 2.

It is also noted that the letter N is used to indicate a variable number of devices or components. For example, a variable number of clients and distributed energy resources are implemented in the power system. Although the letter N is used in describing a variable number of instances of each of these different devices and components, a repeated use of the letter N does not necessarily indicate that each device and component has a same number of N instances implemented in the power system.

Figure 2:
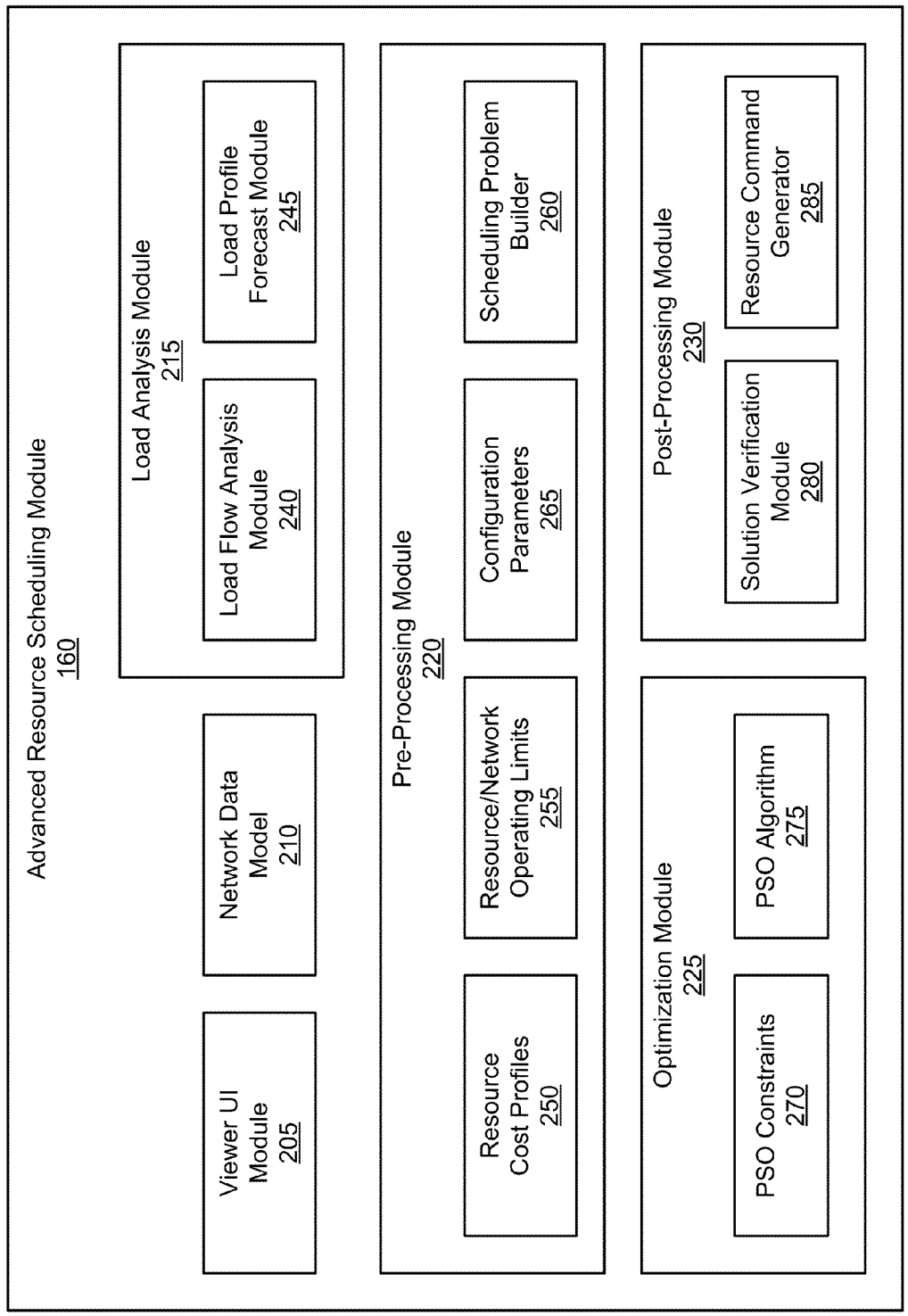
FIG. 2 is a simplified block diagram illustrating components of an example advanced resource scheduling module, according to one embodiment.

FIG. 2 is a simplified block diagram illustrating components of an example advanced resource scheduling (ARS) module 160, which can be implemented in DGM server 120. ARS module 160 can include various components communicatively coupled to one another, such as viewer user interface (UI) module 205, network data model 210, load analysis module 215, pre-processing module 220, optimization module 225, and post-processing module 230. ARS module 160 can be triggered to execute in various manners, such as by an event (e.g., by a power outage or unanticipated increase or decrease in demand in the distribution network), on demand (e.g., by a user), or cyclically (e.g., triggered periodically after a time period has elapsed). Depending on the point in time at which the ARS module is executed (e.g., when the ARS module is triggered), various data, and information obtained by load analysis module 215 (which are further discussed below), pre-processing module 220 is configured to determine a dispatch horizon (or total number of time intervals over which the distributed resource scheduling problem is solved), and to formulate an objective function of the distributed resource scheduling problem (further discussed below). The objective function (or reference thereto) is passed to optimization module 225, which is configured to solve the problem. The solution is passed to post-processing module 230, which is configured to interpret the solution and to take necessary actions to enforce the solution. The components of ARS module 160 are discussed in further detail below.

Viewer UI module 205 is configured to provide user access to ARS module 160 by communicating with a user interface (e.g., communicating with user interface 115 presented on one of clients 110 via network 150). Viewer UI module 205 is also configured to receive user input (e.g., data input entered by a user into user interface 115 on client 110 and received at viewer UI module 205) that specifies engineering data used by ARS module 160, such as a network data model 210, one or more resource cost profiles 250 and resource and network operating limits 255. Viewer UI module 205 is also configured to receive user input that specifies configuration data, such as configuration parameters 265 and particle swarm optimization (PSO) constraints 270. Once engineering and configuration data has been specified by the user and/or received from the distribution network, the ARS module can use such data to generate a resource schedule automatically (e.g., with little to no user intervention), in response to a trigger, such as a network event, a call by the user, or cyclically. Viewer UI module 205 is also configured to provide data to a user interface (e.g., user interface 115 presented on one of clients 110) to display such data to a user (e.g., displaying a load profile, cost functions, and/or a resource schedule).

Network data model 210 is a logical representation of distribution network 150. In one embodiment, a user can populate network data model 210 by specifying a number of logical resources (e.g., a logical representation of each physical DER) to be included in the network data model as well as the arrangement or configuration of such logical resources to represent the implementation of corresponding physical resources (e.g., physical DERs) in the distribution network 150. Different modeling languages can be used to define the network representation, which is stored in a construct such as a network data model file. For example, network data model 210 can be an extensible markup language (XML) model file. In one embodiment, network data model 210 is static, meaning that the network data model need only be populated at some initial point in time. In another embodiment, network data model 210 is dynamic, meaning that the logical resource configuration in network data model 210 can be updated with real-time information received from the distribution network (e.g., changes in availability of physical resources or increased load demand). Each logical resource represents one or more physical resources. If a logical resource represents more than one physical resource, a participation factor is assigned to each physical resource in proportion to its capacity with respect to the total capacity of the combined resource, so that the total of all participation factors associated with physical resources represented by the logical resource is 1.

Figure 3:
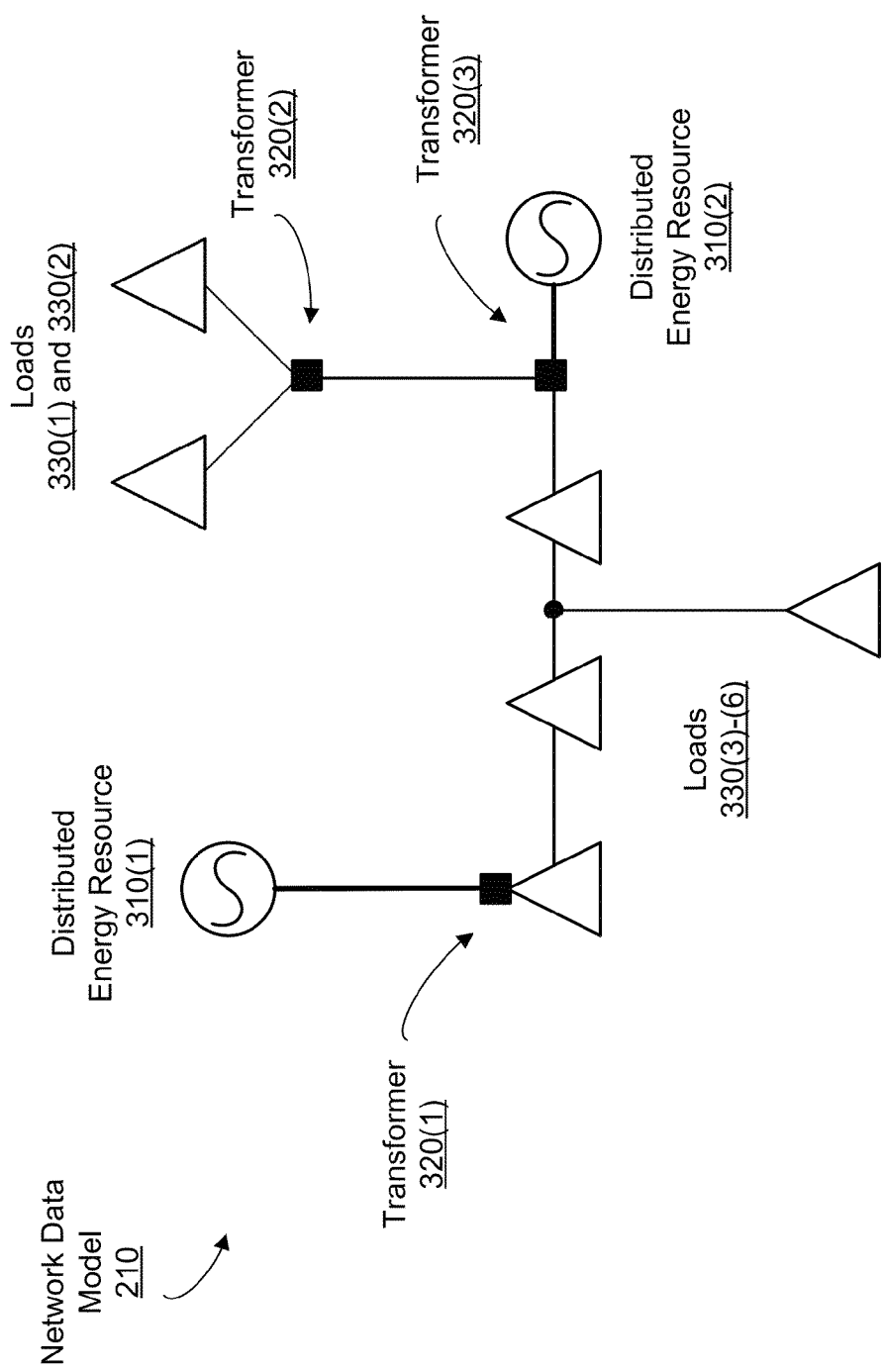
FIG. 3 is a simplified block diagram illustrating an example network data model, according to one embodiment.

An example network data model 210 is illustrated in FIG. 3. As illustrated, network data model 210 includes logical representations of distributed energy resources 310(1)-(2) (visually represented by circular objects, which can be generation resources or storage resources), transformers 320(1)-(3) (visually represented by box objects), loads 330(1)-(6) (visually represented by triangular objects), and transmission/distribution lines (visually represented by lines of differing thickness, where thickness indicates line capacity). Each distributed energy resource should be associated with a unique resource identifier, also referred to herein as an external identifier, which uniquely identifies the resource in the network data model 210. Each distributed energy resource is also associated with a cost profile (which is specified by a user) that models the operating cost of the distributed energy resource as a function of output. Such cost profiles can be stored as part of network data model 210, or can be stored in a separate configuration file that is associated with network data model 210, such as resource cost profiles 250.

Figures 4, 5:
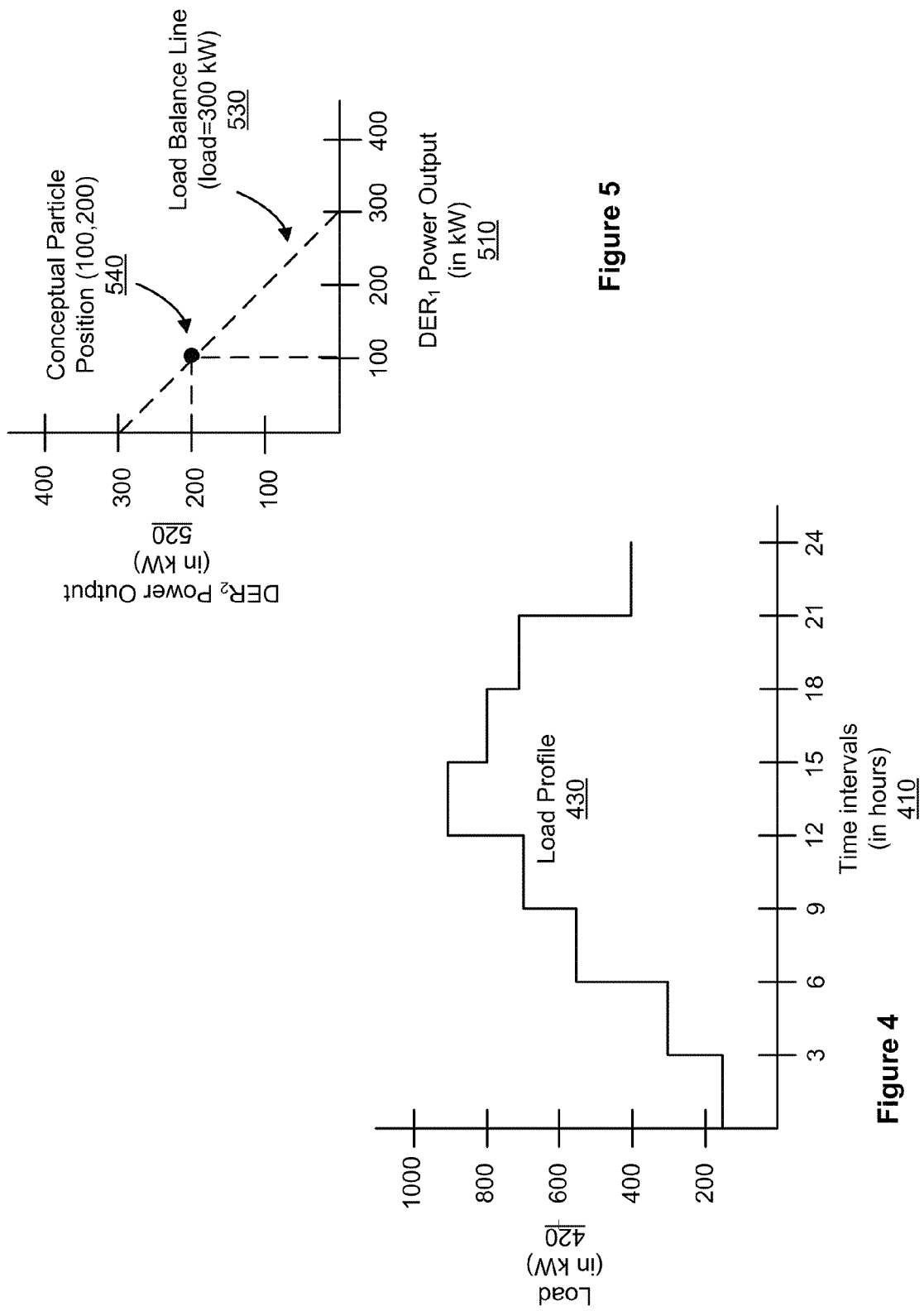
FIG. 4 is a simplified block diagram illustrating an example load profile, according to one embodiment.
FIG. 5 is a simplified block diagram illustrating components of an example two-dimensional problem space, according to one embodiment.

Load analysis module 215 is configured to monitor and evaluate load (e.g., customer power demand) on the resources of the distribution network 150. Load analysis module 215 includes a load flow analysis module 240 and a load profile forecast module 245. Load flow analysis module 240 is configured to maintain historical data of the distribution network 150, such as recording historical load profiles of the distribution network, which describe the varying actual load or power demand placed on the distribution network over time (e.g., multiple historical load profiles that each track actual load of the distribution network over consecutive 24 hour periods). Load profile forecast module 245 is configured to predict a forecasted load profile or load forecast (e.g., a theoretical load or power demand that is anticipated to be placed on the distribution network in the next 24 hour period) based on the historical load profiles (e.g., previous loads or power demands placed on the distribution network under similar conditions). A load forecast can also take network losses into account. An example load profile (e.g., a historical load profile or a forecasted load profile) is illustrated in FIG. 4. In the embodiment illustrated, the x-axis represents time intervals (in hours) 410 and the y-axis represents load 420 (in kilowatts, or kW). The load profile curve 430 has been simplified to show a constant load for each time interval 410 (e.g., a load of 300 kW is shown for time intervals for hours 3-6). The accuracy of the load forecast decreases as time increases (e.g., becomes less accurate the further into the future the forecast goes), and thus can be simplified by ignoring (future) network loss.

Pre-processing module 220 is configured to perform pre-processing of information needed to build the distributed resource scheduling problem, and also to build the distributed resource scheduling problem. Once ARS module 160 has been triggered, pre-processing module 220 is also automatically triggered. Pre-processing module 220 includes a scheduling problem builder 260 that is configured to determine a dispatch horizon and to build an objective function of the distributed resource scheduling problem for the distribution network, using information about the distribution network, such as resource cost profiles 250, resource/network operating limits 255, configuration parameters 265 (which are specified by a user via viewer UI module 205), and other such information.

The objective of solutions to the distributed resource scheduling problem is the minimization of the total production costs incurred by DERs in the network, while producing enough power to meet the required load over the dispatch horizon or scheduling horizon (which is the number of time intervals over which the distributed resource scheduling problem is to be solved). The distributed resource scheduling problem can be expressed as a function (also referred to herein as the objective function) that includes the sum of fuel costs, start-up costs of generation devices (e.g., generators, such as thermal DERs), and local marginal prices (LMPs) for the cost of supply power and storage devices (e.g., batteries). The objective function is discussed in further detail below. Scheduling problem builder 260 then automatically provides the objective function to optimization module 225. Pre-processing module 220 is further discussed below.

Optimization module 225 is configured to automatically solve the objective function of the distributed resource scheduling problem using a specific optimization algorithm, in response to optimization module receiving the objective function from scheduling problem builder 260. In one embodiment, optimization module 225 implements a particle swarm optimization (PSO) algorithm. PSO algorithm 275 is configured to solve the objective function over each time period of the dispatch horizon within PSO constraints 270 (which can be specified by a user via viewer UI module 205). PSO algorithm 275 outputs a solution, which indicates a resource schedule that specifies operating status of DERs 130 (e.g., indicates on/off status and output level of each DER) to meet anticipated load at minimal cost. Optimization module 225 automatically provides the solution to post-processing module 230. Optimization module 225 is further discussed below.

Post-processing module 230 is configured to automatically perform post-processing of the distributed resource scheduling problem, in response to receiving the solution from optimization module 225. Post-processing module 230 includes a solution verification module 280 and a resource command generator 285. Solution verification module 280 is configured to verify the feasibility of the resource schedule by determining whether any constraints have been violated. If a constraint has been violated, it is assumed no feasible solution has been found. In one embodiment, if no feasible solution is found, the PSO algorithm can re-solve the objective problem with modified initial conditions, in an attempt to find a feasible solution, further discussed below. If a solution is verified as feasible, resource command generator 285 is configured to generate a set of control commands that are configured to control a set of controllable resources, where the set of controllable resources are controlled to follow the resource schedule. The resource schedule provides varying scheduled statuses of a resource over the forecasted time intervals of the dispatch horizon, and the resource receives control commands that change the resource's status to match the scheduled statuses as the time intervals occur in real time. Resource command generator 285 generates a new set of control commands for each time interval of a dispatch horizon.

In certain embodiments, resource command generator 285 need only generate commands for resources that have a change in scheduled status from one time interval to the next time interval (e.g., a currently online resource that needs to be powered down for the next time interval will receive an "OFF" control command), rather than reissue the same command for a resource (e.g., a resource that is currently online for the current time interval does not need to receive another command to be online for the next time interval). Resource command generator 285 is also configured to generate new control commands in response to a changed condition or output of the resource (e.g., in response to a power outage of a resource, resource command generator 285 generates a control command to turn on a backup resource). Examples of control commands include commands to power down an online resource (e.g., an OFF command), to power up an offline resource (e.g., an ON command), and to change power output of an online resource (e.g., to increase or decrease power produced by a generation resource or storage resource).

Such commands can be provided to a command sequencer (not shown) that is configured to place the commands in a correct command sequence for a given resource and to communicate the resulting command sequence to corresponding resources. For example, resource command generator 285 can generate commands needed to change statuses of controllable resources over a dispatch horizon, which can be stored at the command sequencer in the proper sequence and scheduled for transmission to respective resources at times that correspond to the scheduled time intervals of the dispatch horizon. The command sequencer can then transmit the commands to each resource at the appropriate time. When a new control command needs to be generated for a resource, resource command generator 285 discards the scheduled commands for the resource (e.g., the commands stored at the command sequencer) before generating the new control command and providing the new control command to the command sequencer.

Particle Swarm Optimization Algorithm

Particle Swarm Optimization (PSO), which is implemented by PSO algorithm 275, is a population-based stochastic optimization technique inspired by natural social behavior (e.g., bird flocking or fish schooling). In one embodiment of PSO, the system is initialized with a number of randomly generated particles at various positions in the problem space defined by the objective function (or problem being solved). This collection of particles is known as a "swarm." The particles move to new positions in the problem space on each iteration of the PSO algorithm. Each particle in the swarm keeps track of its position coordinates in the problem space as the particle moves through the problem space. Each particle stores data for the best solution that the particle has achieved so far, which is called the "local best." The swarm as a whole also keeps track of the best solution that the swarm has achieved so far, which is called the "global best." Each particle "learns" from its local best and the global best, and moves to a next position accordingly. After each position change, a fitness value of each particle is evaluated (where the fitness value reflects the optimization of the position, and thus indicates if the position is a new local best), and local bests and the global best are updated accordingly. After a number of iterations, the global best is presented as the solution.

A particle is a point in multi-dimensional space, which is the defined problem space of the objective function (also referred to as a search space). A particle has a position and velocity, which are used to determine the movement of the particle through the problem space on each iteration of the PSO algorithm. Movement of particles through the problem space can be described by the following two equations. The first equation calculates velocity of a single particle:

$$V_t = \omega V_{t-1} + \rho 1 \text{rand}(\ )(\text{gbest} - X_{t-1}) + \rho 2 \text{rand}(\ )(\text{pbest} - X_{t-1}) \quad (1)$$

where:
$V_t$=new velocity,
$\omega$=inertia constant (this parameter is linearly decreased from 0.9 to 0.4 from first to last iteration),
$V_{t-1}$=previously calculated velocity,
$\rho 1$=learning constant 1,
rand( )=random number between 0 and 1,
gbest=global best,
$\rho 2$=learning constant 2,
pbest=local best, and
$X_{t-1}$=previous position of the particle.

The second equation calculates position of the particle:

$$X_t = V_t + X_{t-1} \quad (2)$$

where:
$X_t$=new position,
$V_t$=velocity calculated in (1) above, and
$X_{t-1}$=previously calculated position.

Velocity is calculated for each dimension of the particle, and thus affects movement of the particle in one or more of the dimensions through the problem space. The position of each particle is updated on each iteration of the PSO algorithm. As the particles move through the problem space, a fitness value is calculated at each position visited by a particle. The fitness value is calculated as a function of the position, which is based on the objective function being optimized (further discussed below). The fitness value can be used to identify whether a particle is positioned at a lower cost position. In other words, the calculated fitness values of a particle's visited positions can be compared to one another to determine whether a (local) minimum cost position has been found. The fitness values and visited positions can be tracked for each particle.

A particle's position is represented by a vector of dimensional values, which in turn represents a possible solution to the objective function (e.g., a minimal cost position of a particle represents a minimal cost solution to the objective function). In a two-dimensional space, for example, each particle position can be specified by the x and y coordinates, where the x-axis and y-axis respectively represent the two dimensions. This concept can be extended to represent the position of a particle in the PSO problem space, where each dimension corresponds to a DER (and thus each participating DER corresponds to a dimension). For example, in a two-dimensional problem space, $DER_1$ output can correspond to the x-axis and $DER_2$ output can correspond to the y-axis. For a particle located at the position (x, y) in the problem space, the x value and y value can indicate the respective operating statuses of $DER_1$ and $DER_2$, also referred to as the operating status of ($DER_1$, $DER_2$). Thus, for N number of DERs, the problem space includes N dimensions, and a particle at position (x, y, . . . N) indicates respective operating statuses of ($DER_1$, $DER_2$, . . . , $DER_N$).

In practice, DER operating status is composed of online/offline status and power output. However, in the present embodiment that implements PSO, the online/offline status is implicit due to minimum and maximum economic operating limits of the DERs. In other words, a DER whose power output is calculated by the PSO algorithm to be below a minimum economic operating limit, or above a maximum economic operating limit, is implicitly determined to be offline. A DER whose power output is calculated by the PSO algorithm to be above or equal to a minimum economic operating limit and below or equal to a maximum economic operating limit is implicitly determined to be online. Thus, the minimum and maximum economic operating limits act as threshold power output levels, where a DER with a power output (calculated by the PSO algorithm) that falls within the threshold power output levels is determined to have online status, and a DER with a power output that falls outside the threshold power output levels is determined to have offline status.

FIG. 5 illustrates a two-dimensional problem space for a system with two DERs. In the embodiment illustrated, the x-axis represents power output 510 of a first DER (i.e., $DER_1$) and the y-axis represents power output 520 of a second DER (i.e., $DER_2$). A load balance curve 530 (e.g., a straight line function for load=300 kW) can be generated for a required load or power demand, such as by obtaining data from a load forecast (or a forecasted load profile) like that illustrated in FIG. 4 (e.g., load of 300 kW is required for hours 3-6). A load balance curve indicates output generation of the DERs that meets or satisfies the required load or power demand. In the embodiment shown, load balance curve 530 indicates that the required load can be provided by a combination of $DER_1$ and $DER_2$. For example, two endpoint solutions (e.g., an endpoint position on the load balance curve 530) obtained from load balance curve 530 indicate the entire 300 kW load can be scheduled to be output from $DER_1$ and 0 kW can be scheduled to be output from $DER_2$ (e.g., $DER_2$ is offline, assuming that 0 kW is below the minimum economic operating limit), or vice versa. An intermediate solution is illustrated at particle position 540, which indicates $DER_1$ can be scheduled to output 100 kW and $DER_2$ can be scheduled to output 200 kW. While the load balance curve can indicate a number of possible solutions, such possible solutions are not necessarily economically feasible (e.g., provide a cost-effective operating plan that satisfies real world economic operating limits).

A swarm is a collection of particles, where each particle indicates a possible solution to the objective function (e.g., each particle position indicates a set of operating statuses of the DERs). The particles ideally converge on a solution that meets the constraints placed on the objective function (e.g., economic operating limits). There exists one swarm for each time interval of the dispatch horizon, where each swarm includes the same number of particles. Because of inter-temporal constraints, such as a minimum up time, minimum down time, or the constraints on state of charge (SOC) in case of energy storage, these swarms are not fully independent. Each particle in a swarm is treated as an initial condition for the particle at the same index in the next swarm (e.g., a position of a particle in a current swarm of the current time interval is used as the initial position for the corresponding particle in the next swarm of the next time interval).

Figure 6B:
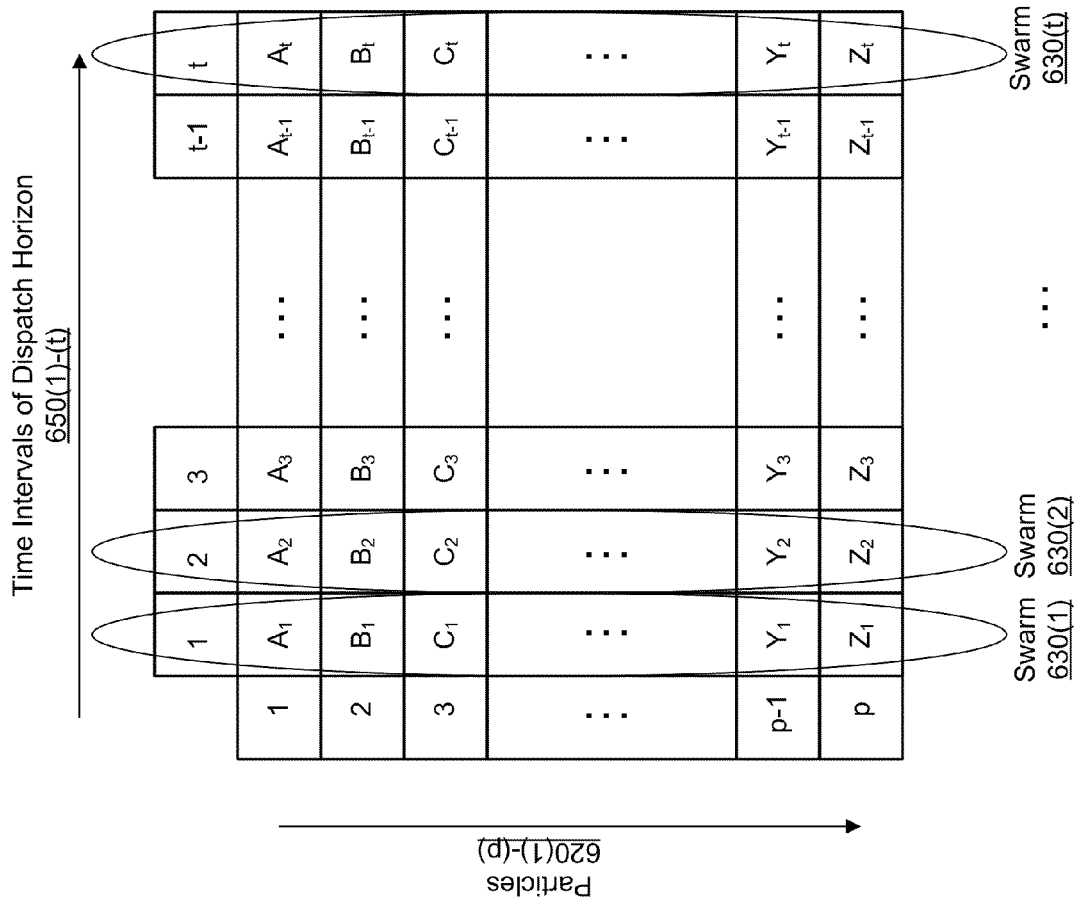

The relationship between swarms and particles is illustrated in FIGS. 6A and 6B. As illustrated in FIG. 6A, a set of particles 620(1)-(p) are generated as a single swarm 630. In an example of an initial iteration of the PSO algorithm, the particles 620 are located at initial positions 640(0) (e.g., $a_0$, $b_0$, $c_0$, etc.) that correspond to an initial time interval $t_0$ that immediately precedes the dispatch horizon (which starts at time interval $t_1$). In one embodiment, the initial positions of time interval $t_0$ are randomly generated. In another embodiment, since each dimension of a given particle corresponds to an operating status of a respective DER, the initial operating statuses (also referred to as initial conditions) of the DERs at time interval $t_0$ can be determined and used to define an initial position of one or more particles at time interval $t_0$. If a DER is an energy storage resource, the initial charge level of the resource is also determined. The logical initial conditions of the DERs can be determined from the (scheduled or current) physical conditions of the DERs, such as by evaluating the scheduled command sequence for the resources. For example, a control command that is set to execute at a time corresponding to the initial time interval $t_0$ can indicate the initial condition of the DER. Using the initial conditions of the DERs to define initial particle positions can increase PSO's accuracy in determining a good (e.g., optimal and feasible) solution. It is also noted that even if all particles are set to an initial position corresponding to the initial conditions of the DERs, each particle will likely move around (and search) the problem space in different directions (i.e., diverge), due to the various random numbers used in each respective velocity function of the particles. The particles may then "hone in" on a minimal cost position (i.e., converge).

Continuing the example of the initial iteration, the PSO algorithm calculates a fitness value for each particle, using the particle's position as an argument in a fitness function. The fitness function is basically the objective function plus any constraint violation penalty functions. As mentioned above, the PSO algorithm is configured to solve the objective function within defined PSO constraints. For example, PSO algorithm can use a given particle's position to determine a corresponding set of DER operating statuses (also referred to herein as an intermediate solution) as input to the objective function to calculate a total production cost for the intermediate solution (e.g., determine the cost of producing enough power to meet required demand, if the DERs of the network operated at the corresponding operating statuses). The PSO algorithm can also use the DER operating statuses of the intermediate solution to evaluate whether the intermediate solution also meets the defined PSO constraints, further discussed below. If any constraints are violated (e.g., the intermediate solution may produce too much power, in excess over the required load and network losses as shown in equation (5) below), a constraint violation penalty can be assessed against the intermediate solution (e.g., the calculated total production cost for the intermediate solution can be increased by a penalty associated with equation (5)). Thus, a fitness value of a particle's position (which represents an intermediate solution) includes the total production cost of the intermediate solution plus any constraint violation penalties of the intermediate solution. If no constraints are violated, the fitness value is equal to the total production cost of the intermediate solution.

The PSO algorithm then initializes a local best solution (also referred to herein as a pBest vector variable) for each particle by assigning each particle's initial position to a respective pBest variable (e.g., pBest of particle 620(p) is assigned the vector of particle 620(p)'s initial position 640(0)). The fitness value of each particle's initial position is also stored in a respective fitness value of the pBest variable, also referred to herein as the pBest fitness value. The PSO algorithm tracks pBest variable and associated pBest fitness value for each particle.

The PSO algorithm also compares the fitness value of each particle to find the minimal fitness value (e.g., in this example, a least or smallest fitness value, since the objective function is being optimized to find a minimal cost solution). The PSO algorithm then initializes the global best solution (also referred to herein as the gBest vector variable) by assigning the particle position associated with the minimal fitness value to the gBest variable (e.g., the best solution of all particles' local best solutions). The minimal fitness value is also stored in a fitness value of the gBest variable, also referred to herein as the gBest fitness value. In one embodiment, the PSO algorithm tracks a single gBest variable and associated gBest fitness value for the swarm.

After initialization of the pBest, gBest, and corresponding fitness value variables, the PSO algorithm performs a first iteration of the optimization process. First, the PSO algorithm uses the initial positions 640(0) of the set of particles 620 to calculate respective new positions 640(1) for each particle (e.g., $a_1$, $b_1$, $c_1$, etc.) using the particle position function of equation (2) above. The PSO algorithm then uses the new set of particle positions 640(1) to calculate a new fitness value for each particle (e.g., uses the particle's position to determine a corresponding set of DER operating statuses, which are used as input in the fitness function, which outputs a fitness value). The PSO algorithm compares each of the newly calculated fitness values with the pBest fitness value. If a new fitness value is found to be less than the pBest fitness value (e.g., a new local minimal cost solution has been found), the PSO algorithm updates the pBest variable to include the new particle position associated with the new fitness value (e.g., overwrites or replaces the pBest particle position with the new particle position), and the pBest fitness value is updated with the new fitness value (e.g., overwrites or replaces the pBest fitness value with the new fitness value).

Similarly, the PSO algorithm also compares the newly updated pBest fitness values with the gBest fitness value (or in another embodiment, compares all pBest fitness values, updated or not, with the gBest fitness value). If a pBest fitness value is found to be less than the gBest fitness value (e.g., a new global minimal cost solution has been found), the PSO algorithm updates the gBest variable to include the particle position of the pBest variable associated with the minimal pBest fitness value (e.g., overwrites or replaces the gBest particle position with the pBest particle position), and the gBest fitness value is updated with the pBest fitness value (e.g., overwrites or replaces the gBest fitness value with the pBest fitness value).

The PSO algorithm performs a predefined number n of iterations 610(1)-(n) of the optimization process for each time interval. For each iteration 610(1)-(n), the PSO algorithm uses a set of positions 640(i) of particles 620 to calculate a next set of positions 640(i+1) of particles 620, determines a fitness value for each particle, and updates pBest, gBest, and corresponding fitness value variables, as discussed above. Thus, for a given time interval, swarm 630 (or set of particles 620(1)-(p)) moves through the problem space, moving from positions 640(0) through positions 640(n). As the swarm moves through the problem space, the optimization process searches for an optimal solution by tracking the local best (pBest) solutions and the global best solution (gBest). At the end of the iterations 610(1)-(n), the global best (gBest) is presented as the (final) solution for the objective problem for the given time interval. Ideally, the global best solution is the optimal solution. In practice, the global best can be close to the optimal solution, especially if well-chosen initial conditions are used.

FIG. 6B illustrates multiple swarms for a dispatch horizon that includes t time intervals. For each time interval t of the dispatch horizon, a single swarm 630 with particles 620 is generated to search for an optimum solution, using the above discussed optimization process (e.g., initializing pBest, gBest, and corresponding fitness values, and performing n iterations of the optimization process for the time interval t). As the dispatch horizon increases (e.g., additional time intervals), the total number of iterations of the PSO algorithm needed to solve the objective function also increases. In one embodiment, the global best solution found by a swarm in time interval t−1 (e.g., a global best particle position for time interval t−1) is used as the initial conditions for one or more particles in the next swarm in the next time interval t. In another embodiment, the final local best solutions of the particles in one swarm (e.g., the local best particle combination) are used as the initial conditions for corresponding particles in the next swarm. The (final) global solution of each time interval t can be used to generate a corresponding resource schedule over the dispatch horizon, where a global solution vector of each time interval t (e.g., the global solution vector is the global minimal cost particle position) can be translated into output statuses for a set of DERs (e.g., each dimension of the global minimal cost particle position represents an operating status for a DER).

The resource schedule (or set of global solutions for time intervals 650(1)-(t)) can be provided to a post-processing module for verification of the solution. The post-processing module can check each global solution for any constraint violations that might occur in implementing the global solution in real time (e.g., constraint violations due to rounding errors, where a resource might be unable to control its output down to an order of magnitude needed to meet the scheduled output). In one embodiment, if a global solution of a particular time interval does not pass the verification, the optimization process may be performed again for that time interval, using forced initialization to change the initial position of at least one particle (e.g., change the initial conditions of at least one DER from offline to online, which changes the position of the particle) in an attempt to find a better global solution for that particular time interval. In one embodiment, since the time intervals can be inter-temporally connected (e.g., the scheduled operation status of a DER before and after the particular time interval, along with the minimum up time of the DER, may require the DER to remain online during the particular time interval), only the global solution for that particular time interval needs to be re-calculated. In another embodiment, the global solutions of time intervals subsequent to the particular time interval can also be recalculated. If each global solution of the dispatch horizon passes the verification, post-processing module can generate resource control commands for respective resources from the resource schedule. The resource control commands can then be provided to a command sequencer, which provides the appropriate commands to the respective resources at the appropriate time, according to the resource schedule.

PSO Configuration Parameters

The following PSO configuration parameters are stored in configuration parameters file 265. PSO algorithm 275 cannot guarantee the optimality of a solution, since such a guarantee would require iterating through all possible combinations of the objective function, which may take years to complete in some cases. Further, PSO algorithm cannot tell how close a given solution is to the optimal solution (but can use fitness values of the solutions to find the best solutions of the iterated solutions). Thus, PSO configuration parameters are used to tailor the initial conditions of the PSO velocity and position functions to solve the objective function in a reasonable amount of time (e.g., iterate through a smaller subset of all resource scheduling combinations to try to get close to the optimum solution).

TABLE 1

PSO Configuration Parameters

| | |
|---|---|
| Population: | Number of particles in a swarm. This parameter is preferably set at a default value of 20, but it can be varied from 10 to 40. |

TABLE 1-continued

PSO Configuration Parameters

| | |
|---|---|
| | This parameter typically does not need to be changed from the default value. |
| Velocity limit | This is the limit on the velocity described above. This parameter is preferably set at 20 or can be set to a default value of 300, but can be any number greater than or equal to zero (0). This parameter can be changed to best suit the problem. Setting this value to zero (0) will result in dynamic velocity limits that are calculated as the difference between maximum operating limit and minimum operating limit. |
| Inertia constant | This parameter is preferably about 1.0, but it can be varied from 1.2 to 0.8. |
| Inertia constant low limit | This parameter is preferably about 0.5, but it can be varied from 0.6 to 0.4. To disable the variation of the inertia (which usually does not give better results), set it to the same value as that of the inertia constant. |
| Learning constant 1 | The learning constants should be set such that the learning constant 1 should be greater than learning constant 2, and that the summation of learning constant 1 and learning constant 2 preferably add up to a value between 3.0 and 4.0. Learning constant 1 is preferably set at a default value of 1.9. |
| Learning constant 2 | The learning constants should be set such that the learning constant 1 should be greater than learning constant 2, and that the summation of learning constant 1 and learning constant 2 preferably add up to a value between 3.0 and 4.0. Learning constant 2 is preferably set at a default value of 1.7. |
| Number of iterations | Number of iterations of the particle swarm optimization. This parameter depends upon the size of the problem. For a greater number of time intervals, a greater number of iterations are needed. For example, about 30,000 iterations for 24 intervals work well, while about 60,000 iterations for 48 intervals works well. A default number of iterations is 30,000, but can be any number greater than or equal to zero. |
| Initial penalty factor | This parameter is used to calculate penalties for the constraint violations, and typically does not need to change. An example default value of this parameter is 100, but can be any number greater than or equal to zero. |
| MUT/MDT penalty | The minimum up time (MUT) or minimum down time (MDT) violation penalty is preferably set to a value between the range of 70 to 80% of the total production cost in one interval. This is an approximate value that can be rounded up. An example default value of this parameter is 10,000, but can be any number greater than or equal to zero. |
| Forced initialization | The PSO solution quality may be influenced by the initial condition. There are two policies used for initializations: Normal: All resources' previous state (ON/OFF) is maintained as long as possible. The resources are turned ON if needed but are not turned off during initialization. Forced: All resources that do not have MUT or MDT constraint are turned ON for the initialization. |
| Heuristic step size | Resource scheduling uses conventional merit order method to fine tune its results to some extent. This parameter represents the adjustment in power output for a DER that will be performed at a time. This parameter is preferably set at a default value of 5, but can be any number greater than or equal to 0.5. This value can be large (e.g., 25) if all resources have a linearized segmented cost function (further discussed below). If some of the resources have a quadratic cost function, the step size should be smaller—i.e. range of the largest unit/number of heuristic iterations. |
| Number of maximum heuristics iterations | This parameter is the maximum number of iterations performed by the heuristic. An example default value of this parameter is 1000, but can be any number greater than or equal to zero. Default value is usually good enough, and does not need to change. |

Objective Function of the Distributed Resource Scheduling Problem

The distributed resource scheduling problem for pre-processing module 220 is formulated as follows. The objective of the distributed resource scheduling problem is the minimization of the total production costs over the dispatch horizon or scheduling horizon (e.g., the number of time intervals over which the distributed resource scheduling problem is to be solved). Thus, the distributed resource scheduling problem can be expressed as a function (also referred to herein as the objective function) that includes the sum of fuel costs, start-up costs of the power generation devices (e.g., generators, such as thermal DERs), and local marginal prices (LMPs) for the cost of supply power and the energy storage devices (e.g., batteries). For an N number of DERs, the total production cost (TPC) for the dispatch horizon (or T time intervals) can be expressed mathematically as the following objective function:

$$TPC_{NT} = \sum_{t=1}^{T} \left[ \left( \sum_{i=1}^{i=D} [F_{it}(P_{it}) + ST_i(1 - U_{i(t-1)})]U_{it} \right) + \left( \sum_{i=1}^{i=B} LMP_t(P_{charge(t)} - P_{discharge(t)}) \right) \nabla \tau \right] \quad (3)$$

The energy storage energy level can be expressed using a State of Charge (SOC) model:

$$E_t = E_{t-1} + \left[ \nabla \tau \left( P_{charge(t)} \eta_c - \frac{P_{discharge(t)}}{\eta_d} \right) \right] \quad (4)$$

where:
N=total number of DERs including the grid supply=D+B,
D=Number of thermal DERs including the grid supply,
B=Number of energy storage resources,
$TPC_{NT}$=Total production cost for N DERs for T time intervals,
$P_{it}$=Power output of DER i in time interval t,
$F_{it}(P_{it})$=Cost function expressed as function of power output of DER i in time interval t,
$ST_i$=Startup cost for DER i,
$U_{i(t-1)}$=Status of DER i in time interval t−1,
$U_{it}$=Status of DER i in time interval t,
$LMP_t$=Local Marginal Price closest to the point of coupling for time period t,
$P_{charge(t)}$=Charging power for the time period t,
$P_{discharge(t)}$=Discharging power for the time period t,
$E_t$=Energy storage level in time interval t,
$E_{t-1}$=Energy storage level in time interval t−1,
$\nabla \tau$=Size of the time interval,
$\eta_c$=Charging efficiency, and
$\eta_d$=Discharging efficiency.

In the embodiment shown, the objective function includes optimization for both generation resources and storage resources. In another embodiment, the objective function can separately optimize the generation resources and storage resources. Other embodiments can include multiple instances of the PSO algorithm, and include different configurations of the PSO algorithm instances.

PSO Constraints

The objective function is built by scheduling problem builder 260 and provided to optimization module 225. The objective function is then solved by optimization module 225 using PSO algorithm 275, which minimizes $TPC_{NT}$ (e.g., solve the objective function for the best or minimal cost solution) subject to PSO constraints 270, discussed below. The constraints provide real world (e.g. economic) limitations, within which the optimal solution should be found (e.g., the optimal solution should not violate the constraints). However, the addition of constraints increases complexity of the problem and reduces the possibility of obtaining a good solution. In worst cases, the optimal solution may be no better than an initial random solution, especially if the constraints are too restrictive.

Load Balance Constraint (Also Referred to as Power Balance Constraint) This constraint requires that network load plus network loss equal the total generation.

$$\sum_{i=1}^{i=D} P_{it} + \sum_{i=1}^{i=B} Pb_{it} + P_{NCder(t)} = Pload_t + Ploss_t \quad (5)$$

where:
Pload$_t$=Total load demand for the network within the DGM area during time interval t,
Pb$_{it}$=Net power output (discharging power minus charging power) of energy storage resource i for time interval t,
Ploss$_t$=Network losses in time interval t, and
P$_{NCder(t)}$=Net power generation from non-controllable DERs (including manual resources) in time interval t.

Required Reserve Constraint (Also Referred to as a Spinning Reserve Constraint)
This constraint requires that the total online reserve capacity is at least the specified amount.

$$\sum_{i=1}^{i=D} P\max_{it} U_{it} + \sum_{i=1}^{i=B} Pb\max_{it} = Pload_t = RReq_t \quad (6)$$

where:
Pmax$_{it}$=maximum operating limit of thermal DER i in time interval t,
Pbmax$_{it}$=maximum discharge rate of energy storage resource i in time interval t, and
RReq$_t$=Required level of reserve capacity for the DGM area during time interval t.

DER Economic Operating Limit Constraint
This constraint requires that the output of an online resource falls within the resource's economic operating limits.

$$P_{itmin} \leq P_{it} \leq P_{itmax} \quad (7)$$

where:
P$_{itmin}$=minimum economic operating limit for DER i, and
P$_{itmax}$=maximum economic operating limit for DER i.

Minimum Up Time Constraint
The minimum up time constraint requires that, once online, a resource stays online (ON) for a minimum specified time period before it can be turned off again.

$$X_i^{on}(t) \geq MU_i \quad (8)$$

where:
X$_i^{on}$(t)=time in ON status for DER i in time interval t, and
MU$_t$=Minimum up time for the DER i.

Minimum Down Time Constraint
The minimum down time constraint requires that, once offline, a resource stays offline (OFF) for a minimum specified time period before it can be brought back online again.

$$X_i^{off}(t) \geq MD_i \quad (9)$$

where:
X$_i^{off}$(t)=time in OFF status for DER i in time interval t, and
MD$_i$=Minimum down time for DER i.

Energy Storage Charge/Discharge Rate Limit Constraints
These constraints require that charging or discharging rate (power output) falls within the charging or discharging rate limits of the energy storage resource. The charging/discharging rate limits can be specified as functions of the state of charge of the energy storage resource.

$$Pcharge_{it} \leq Pcharge_{it}^{max} \quad (10)$$

where:
Pcharge$_{it}$=charging power of energy storage resource i in time interval t, and
Pcharge$_{it}^{max}$=maximum charging power limit of energy storage resource i in time interval t;
and $$Pdischarge_{it} \leq Pdischarge_{it}^{max} \quad (11)$$

where:
Pdischarge$_{it}$=discharging power of energy storage resource i in time interval t, and
Pdischarge$_{it}^{max}$=maximum discharging power limit of energy storage resource i in time interval t.

Energy Storage Resource Energy Level (State of Charge) Constraint
This constraint requires that the energy level of an energy storage resource falls within a minimum limit and maximum limit of the energy level (hence, the excess charging energy cannot be accommodated and may cause damage to the resource).

$$E_i^{min} \leq E_{it} \leq E_i^{max} \quad (12)$$

where:
E$_i^{min}$=minimum energy level allowed for energy storage resource i,
E$_{it}$=energy level for energy storage resource i at the end of time interval t, and
E$_i^{max}$=maximum possible energy level for energy storage resource i.

Energy Storage Final State of Charge Constraint
This constraint states that the energy level for a storage resource at the end of the dispatch horizon cannot be less than specified amount.

$$E_{final}^{min} \leq E_{it} \quad (13)$$

where:
E$_{final}^{min}$=final minimum energy level allowed for energy storage resource i.

Cost Functions
Each resource is associated with at least one cost function (e.g., a default cost function) that represents the operating cost of the resource, stored as resource cost profiles 250. Each resource needs to have at least one cost function that covers the dispatch horizon. ARS module 160 supports two types of cost functions: quadratic cost functions and linearized segmented cost functions. A quadratic cost function is stated as aP$^2$+bP+c where:
a, b, and c are constants, and the constant c represents no load cost of the unit, and
P is the power output of the unit.

Figure 7A:
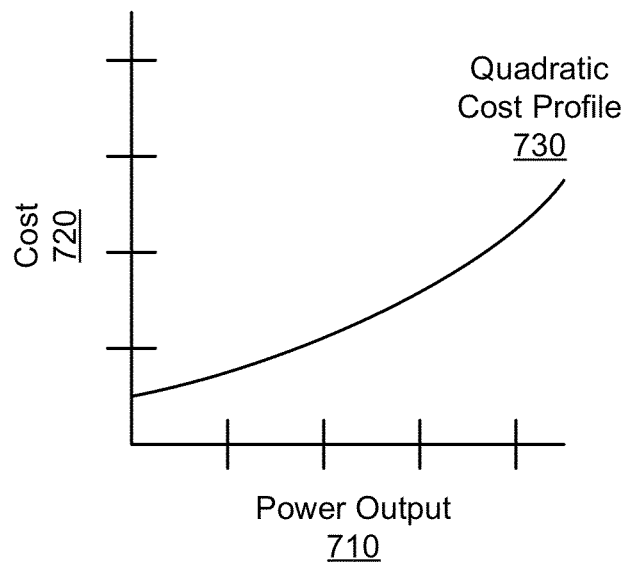
FIGS. 7A and 7B are simplified block diagrams illustrating example cost profiles, according to one embodiment.

An example of a quadratic cost function or profile is illustrated in FIG. 7A. Quadratic cost profile 730 is a function of a resource's power output 710 and operation cost 720. As indicated in FIG. 7A, increased power output results in increased cost.

Figure 7B:
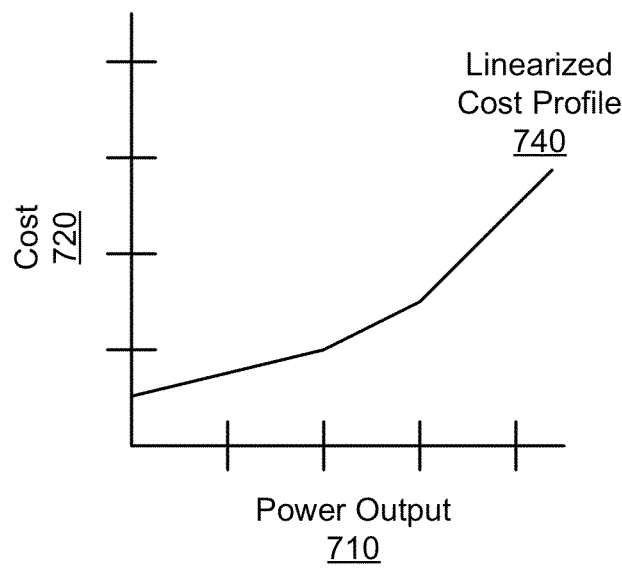

A linearized segmented cost function is stated as a number of cost and output pairs. Quadratic cost functions are often approximated as a number of linearized segments, and in most cases as a single linear segment. An example of a linearized segmented cost function or profile is illustrated in FIG. 7B. Linearized cost profile 740 is also a function of a resource's power output 710 and operation cost 720. As similarly indicated in FIG. 7B, increased power output results in increased cost.

ARS module 160 also supports dynamic cost functions, where the user can specify different cost functions for different time periods. The dynamic cost functions can be used to override any default cost function configured for a corresponding time period. In one embodiment, the dynamic cost functions are provided in an input file (e.g., a comma-separated value) by specifying the following attributes for each cost function.

TABLE 2

Dynamic cost functions

| | |
|---|---|
| External resource name | Unique identifier (e.g., external identifier) of a resource. |
| Start and end time | Start and end time of the period during which the cost function is in effect (e.g., in format "mm/dd/yyyy HH24: mm"). |
| Cost function type | Indicates cost function is quadratic, linearized segmented, and/or dynamic. |
| Cost function data | Includes cost function data points for linearized segmented function, and/or cost function equation of quadratic curve. Since dynamic, multiple sets of cost function data for each cost function curve can be included. |

Energy storage cost functions meet maximum charging and discharging rate limits. For example, a user can specify a linearized segmented cost curve that includes a single segment, where the slope of the segment represents the local marginal price (LMP) of the energy storage resource. The lower bound of such a segment is (0,0) and the upper bound of the segment covers the maximum charging and discharging rate limit.

Operating Limits

Pre-processing module 220 (e.g., scheduling problem builder 360) also uses engineering data associated with the DERs, also referred to herein as resource/network operating limits 255, in addition to the network data model 210. Resource operating limits indicate limits placed on operation of a given resource. Network operating limits indicate limits placed on operation of the network, which can affect any number of the power system's resources, such as transmission/distribution line capacity (not shown). The following engineering data or operating limits 255 are specified by a user:

TABLE 3

Operating Limits

| | |
|---|---|
| External name of resource | This external name of a resource matches the unique external identifier of the resource in the network data model. |
| Physical (flag) | Indicates whether the resource maps directly to the resource in the network model. |
| Minimum operating limit | The minimum power output value the resource can produce in a stable manner. |
| Maximum operating limit | The maximum power output value the resource can produce in a stable manner. |
| Minimum economic limit | A minimum prescribed power output value that the resource, if online, should meet to maintain a cost-efficient resource scheduling solution. A power output value computed for a DER that falls below the minimum economic limit might result in inefficient underload of the DER, and thus the DER can be implicitly determined to be offline in such a scenario. |
| Maximum economic limit | A maximum prescribed power output value that the resource, if online, should not exceed to maintain a cost-efficient resource scheduling solution. A power output value computed for a DER that ranges above the maximum economic limit might result in overload of the DER, and thus the DER can be implicitly determined to be offline in such a scenario. |

TABLE 3-continued

Operating Limits

| | |
|---|---|
| Startup time | The time required to startup a resource (e.g., the time required to perform initialization operations for the resource), before the resource begins operating (e.g., generating power or storing energy). |
| Startup cost | The cost for startup of a resource (e.g., operating cost to perform initialization operations for the resource, such as fuel costs to perform such operations). |
| Minimum up time | If a resource is already up or online, the resource should remain online for a duration of the minimum up time. |
| Minimum down time | If a resource is already down or offline, the resource should remain offline for a duration of the minimum down time. |
| Cost function type | Indicates cost function is quadratic, linearized segmented, and/or dynamic. |
| Default cost curve | A cost function that is designated as a default cost curve for a resource, which will be used if no other cost function is specified by a user. |

Participating and Non-Participating Resources

The ARS module considers resources that are in automatic mode or are otherwise controllable (e.g., are capable of being controlled remotely by distribution grid management server 120) for at least one time interval during the dispatch horizon as a participating resource (e.g., as an available or online resource that can be scheduled for operation by the ARS module). A participating resource has a cost function that covers the entire capacity of the DER. Only participating resources are scheduled by the ARS module. For example, resources that are in manual mode (e.g., manual energy generation resources) or are otherwise non-controllable (e.g., cannot be controlled remotely by distribution grid management server 120) are considered non-participating resources, and thus are not scheduled for operation by the ARS module (e.g., are not included in the distributed resource scheduling problem generated by the pre-processing module). However, the expected power output from such non-participating resources may be taken into account in other aspects of the distributed resource scheduling problem (e.g., a battery in manual mode that can be quickly accessed may be included in determining the required reserve capacity of the distribution network, or the expected generation output from non-participating resource can be included in a load forecast). While a manual resource is not scheduled by the ARS module, the manual resource can be manually scheduled via manual commands.

A grid-tie system (or other load following resource) is a non-controllable resource (e.g., cannot be controlled by DGM server 120), but is considered a participating resource because the grid-tie system adjusts its power output as demands for electricity fluctuate. However, no control commands are generated for the grid-tie system.

Dispatch Horizon

The pre-processing module determines the dispatch horizon before building the objective function. The dispatch horizon is determined by the configured number of time intervals to be included in the dispatch horizon (e.g., a number of time intervals specified by a user), time interval duration (e.g., a duration of time specified by a user), and the lead time. These parameters are configured in (and thus stored in) configuration parameters file 265. The start of the dispatch horizon is determined by the execution time of the ARS module (or the time the ARS module is triggered to execute) and the lead time.

The execution time of the ARS module can be performed cyclically (e.g., ARS is triggered every m minutes). The cycle time is also configured in configuration parameters 265. Common cycle time values for triggering the ARS module are 1 minute, 5 minutes, 10 minutes, 15 minutes, 20 minutes, 30 minutes, and 60 minutes. An example default cycle time is 30 minutes. In one embodiment, the execution of ARS module is clock synchronized (e.g., if cycle time is 15 minutes, the ARS module will execute at 00, 15, 30, and 45 minutes on the hour). An example ARS module can be executed cyclically every hour.

Common time interval durations (or lengths or sizes) are 5 minutes, 10 minutes, 15 minutes, 30 minutes and 60 minutes. An example default time interval duration is 60 minutes. In one embodiment, the time intervals are also clock synchronized (e.g., a 15 minute time interval will start at 00, 15, 30 or 45 minutes into the hour, while a 60 minute interval will start only at the top of the hour, or at 00 minutes into the hour). An example dispatch horizon can include 24 one-hour (or 60-minute) time intervals (i.e., the dispatch horizon is 24 hours long) or 48 one-hour time intervals (i.e, the dispatch horizon is 48 hours long). An example default dispatch horizon is 24 time intervals.

The minimum lead time specifies the minimum time after the execution time before the dispatch horizon starts. The minimum lead time is needed for three purposes:
a) Most resources need certain amount of time to start (e.g., come online, such as perform initialization procedures) or stop (e.g., go offline, or perform shutdown procedures);
b) Communication delay prevents a command from being executed instantly, so control programs of the resources may need time to execute the solution provided by the ARS module; and
c) The execution of ARS module itself is not instantaneous. It takes some amount of time for ARS to complete the performance of the distributed resource scheduling process. For example, if a given problem takes 2 minutes to solve, the solution takes 2 seconds of communication delay to reach a resource, and the resource takes 5 minutes to start or stop, the minimum lead time will be 7 minutes and 2 seconds. Rather than using the minimum lead time in practice, it would be appropriate to use a lead time greater than the minimum lead time to ensure the complete execution of a decision made by the ARS module, in case of any additional delays.

Thus, the lead time parameter ensures that there is enough time between execution time and the start of the dispatch horizon. The lead time should consider the longest amount of time needed to execute a decision made by the ARS module (e.g., time to perform optimization, translate the solution into resource commands, communicate the commands to respective resources, and execute the commands). For example, if startup time for a generator is 20 minutes, and the communication time is 5 minutes, then it will be appropriate to set the lead time to 30 minutes (add time to allow for the ARS module to complete performance of the distributed resource scheduling process and any additional delays). This ensures that the start of the dispatch horizon will always be a minimum 30 minutes away from the execution time. A different or larger lead time can be selected (e.g., 60 minutes), depending on the time interval duration and/or any known delays that would affect completion of the ARS module performance. It is noted that a shorter lead time has the advantage of better quality load estimation, especially for periods close to the start of the dispatch horizon. An example default lead time is 30 minutes, but can be varied (e.g., from 15 to 60 minutes), as needed.

Figure 8:
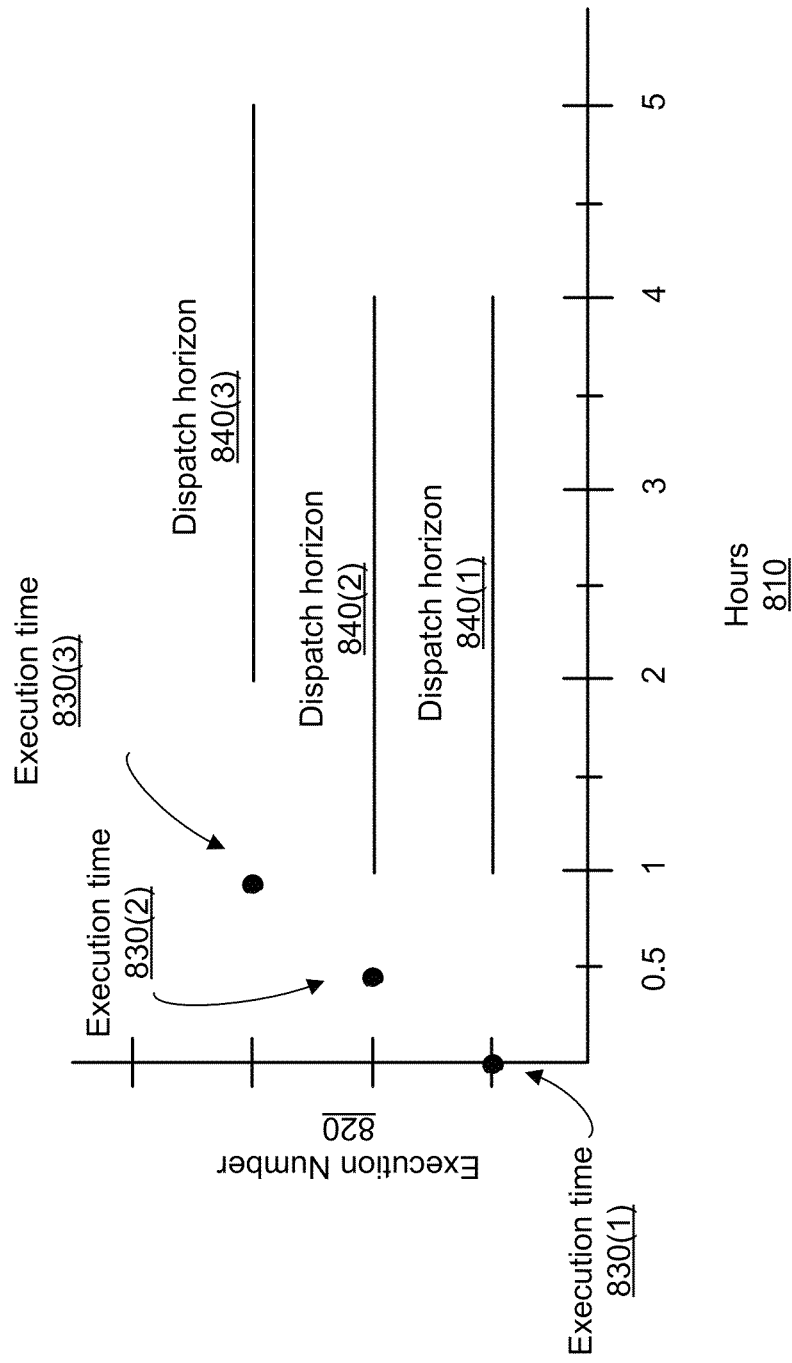
FIG. 8 is a simplified block diagram illustrating example dispatch horizons, according to one embodiment.

Example dispatch horizons, relative to execution time, are illustrated in FIG. 8. In the embodiment illustrated, the x-axis represents time in hours 810 and the y-axis represents an execution number 420. Using a 30 minute lead time, a 60 minute cycle time, and 3 time intervals of 60 minutes, dispatch horizons 840(1)-(3) are determined. At execution time 830(1), ARS module is triggered to perform resource scheduling over dispatch horizon 840(1). ARS module can determine the dispatch horizon 840(1) starts at the next cycle time, or at hour 1. If ARS module is triggered after the cycle time at execution time 830(2), ARS module can still determine the dispatch horizon starts at the next cycle time, as long as the 30 minute lead time is met. Since execution time 830(2) occurs at least 30 minutes before the next cycle time (hour 1), dispatch horizon 840(2) also starts at hour 1. However, if ARS module is triggered at execution time 830(3) after a point when the 30 minute lead time cannot be met (e.g., triggered in the 30 minutes before hour 1), the dispatch horizon will start at the next cycle time, or at hour 2. Thus, an execution time that does not meet the lead time is effectively treated as an execution time at the next cycle time h, and the dispatch horizon will start at the following cycle time h+1. In some embodiments, the dispatch horizon and the cycle time can use the same (or equal) time durations (e.g., a 60 minute cycle time and a 60 minute time interval duration).

Time Interval-Specific Data

Various attributes of the DERs, which are stored as various data (e.g., stored in resource cost profiles 250, resource/network operating limits 255, PSO constraints 270), may be different over the course of the dispatch horizon. For example, operating costs of a DER may be represented by different cost functions for different time intervals. Other examples of time interval-specific data include:

TABLE 4

Time Interval-specific Data

| | |
|---|---|
| Resource limits | There may be a variety of reasons the resource limits can change from one time interval to another time interval, such as for partial de-rates or partial re-rates. In one embodiment, the resource economic operating limits are constant for generation resources, while resource economic operating limits are dynamically calculated for storage resources. |
| Resource constraint | Each time interval can have a differing value for a resource, such as whether the resource can be ON or OFF for the time interval, or should operate at a given fixed output value over the time interval (which may be due to scheduled islanding or other user actions). |
| Cost function (cost curve) | The resource cost function may depend upon time of the day (e.g. the cost is derived from electricity price in the market). |
| Minimum state of charge for energy storage | Depending upon final minimum state of charge (see the problem formulation for energy storage devices), the minimum state of charge in any time interval may be constrained due to limits on the rate of charge. |
| Limit Calculator for energy storage | The charge/discharge limits on energy storage depend upon the State Of Charge (SOC) of the energy storage device. The calculator uses static data such as static limits and efficiencies, but it also uses minimum SOC which is time interval specific data, hence you need a separate instance of the calculator for each time interval. The EnergyStorageLimitCalculator( ) implements the ILimitCalculator interface to keep the static data and specific implementation isolated from the optimization algorithm. |

Additionally, PSO constraints can have different values for different time intervals. For example, the load balance constraint can be determined for each time interval, where the load balance constraint uses the load forecast generated by the load analysis module. The load analysis module uses current (actual) load values and losses of the network to generate the load forecast. If these values are unavailable for a time interval (e.g., the values have not yet been determined from the network), average load and loss values (based on previous load and loss values recorded) can be used. The load balance constraint can be determined for a time interval according to the following equation (similar to equation 5 above):

$$LB_T = \text{predicted } Pload_t + \text{predicted } Ploss_t \text{ (if available)} - G_{non\text{-}controllable} - G_{manual} \quad (14)$$

where:
$G_{non\text{-}controllable}$=forecast generation from non-controllable DERs, and
$G_{manual}$=generation from manual resources.

The forecast generation from the uncontrollable resources can be obtained from generation forecast curves for such resources (e.g., obtained from historical or average generation profiles of the resources). The generation from manual resources can be calculated from the current resource condition (e.g., current ON/OFF status and output level) and any manually scheduled commands for the resource from the present time through the end of the dispatch horizon (e.g., the commands sequenced to be executed by the resource during time intervals of the dispatch horizon indicate the power output of the resource).

As another example, the required reserve constraint can also be determined for every time interval. Actual load values recorded by the load analysis module, or historical/average load values, can be used to determine the required amount of reserve capacity.

Figures 10A, 10B:
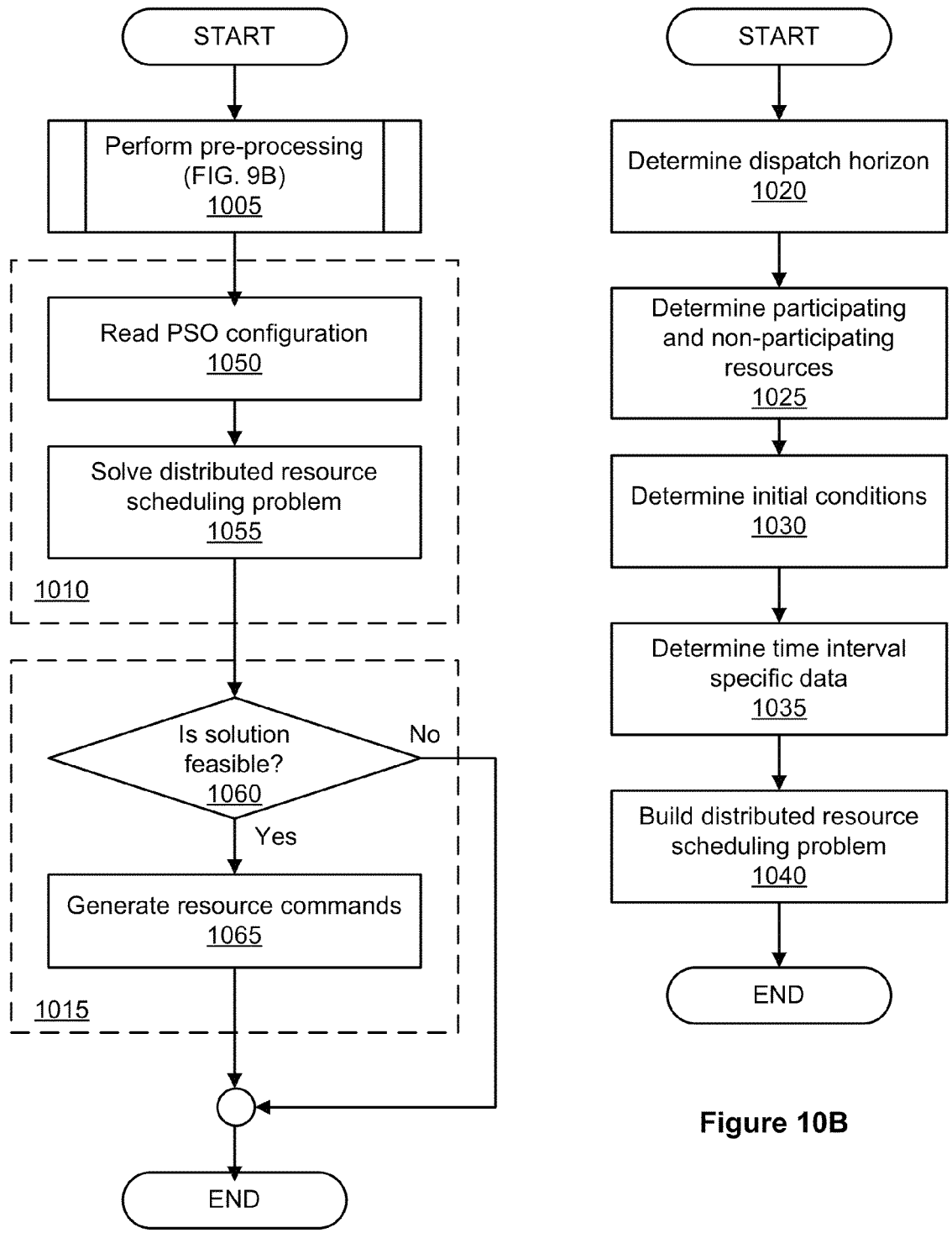
FIGS. 10A and 10B are flowcharts illustrating an example process implemented by an advanced resource scheduling module, according to one embodiment.

FIGS. 10A and 10B are flowcharts illustrating an example process implemented by an advanced resource scheduling (ARS) module (e.g., cooperatively implemented by a pre-processing module, an optimization module, and a post-processing module). The process can be triggered in response to an event (e.g., by a power outage or unanticipated increase in demand in the distribution network), on demand (e.g., by a user), or cyclically (e.g., triggered after a time period has elapsed). The process illustrated in FIGS. 10A and 10B is broadly divided into three sub-processes: pre-processing (operation 1005 in FIG. 10A, and further discussed in FIG. 10B) performed by pre-processing module 220, optimization (sub-section 1010 that includes operations 1050-1060 in FIG. 10A) performed by optimization module 225, and post-processing (sub-section 1015 that includes operations 1065-1070 in FIG. 10A) performed by post-processing module 230.

The process illustrated in FIG. 10A begins at operation 1005, where the pre-processing module performs pre-processing, as further illustrated in FIG. 10B. A distributed resource scheduling problem is built by the pre-processing module during the process of FIG. 10B, which is provided to the optimization module (discussed below). Returning to operation 1005, the process illustrated in FIG. 10A continues to operation 1050, where the optimization module reads the PSO configuration (e.g., the distributed resource scheduling problem and PSO constraints). As discussed above, the optimization module solves the distributed resource scheduling problem using the PSO algorithm over a dispatch horizon, as constrained by the PSO constraints.

The process continues to operation 1055, where the optimization module solves the distributed resource scheduling problem. The process continues to operation 1060, where the post-processing module determines whether a solution is feasible. If a solution is not feasible (e.g., the solution violates a constraint), the process ends. In another embodiment, if a solution is not feasible, the post-processing module can trigger the pre-processing module to determine modified initial conditions (e.g., perform operation 1030) and can trigger the optimization module to re-solve (e.g., execute the optimization sub-process 1010 for a second time) the objective function, using the modified initial conditions to attempt to find a feasible solution.

Returning to operation 1060, if a solution is determined to be feasible (e.g., the solution does not violate any constraints), the process continues to operation 1065, where the post-processing module generates resource commands for respective resources from the verified solution. Although not shown, the post-processing module can provide the resource commands to a command sequencer, which provides the appropriate commands to respective resources at appropriate time intervals. The process then ends.

The process illustrated in FIG. 10B begins at operation 1020, where the pre-processing module determines the dispatch horizon. The process continues to operation 1025, where the pre-processing module determines participating and non-participating resources. The process continues to operation 1030, where the pre-processing module determines initial conditions. The process continues to operation 1035, where the pre-processing module determines time interval specific data. The process continues to operation 1040, where the pre-processing module builds the distributed resource scheduling problem. The process then ends.

Example Software Implementation

Figure 9:
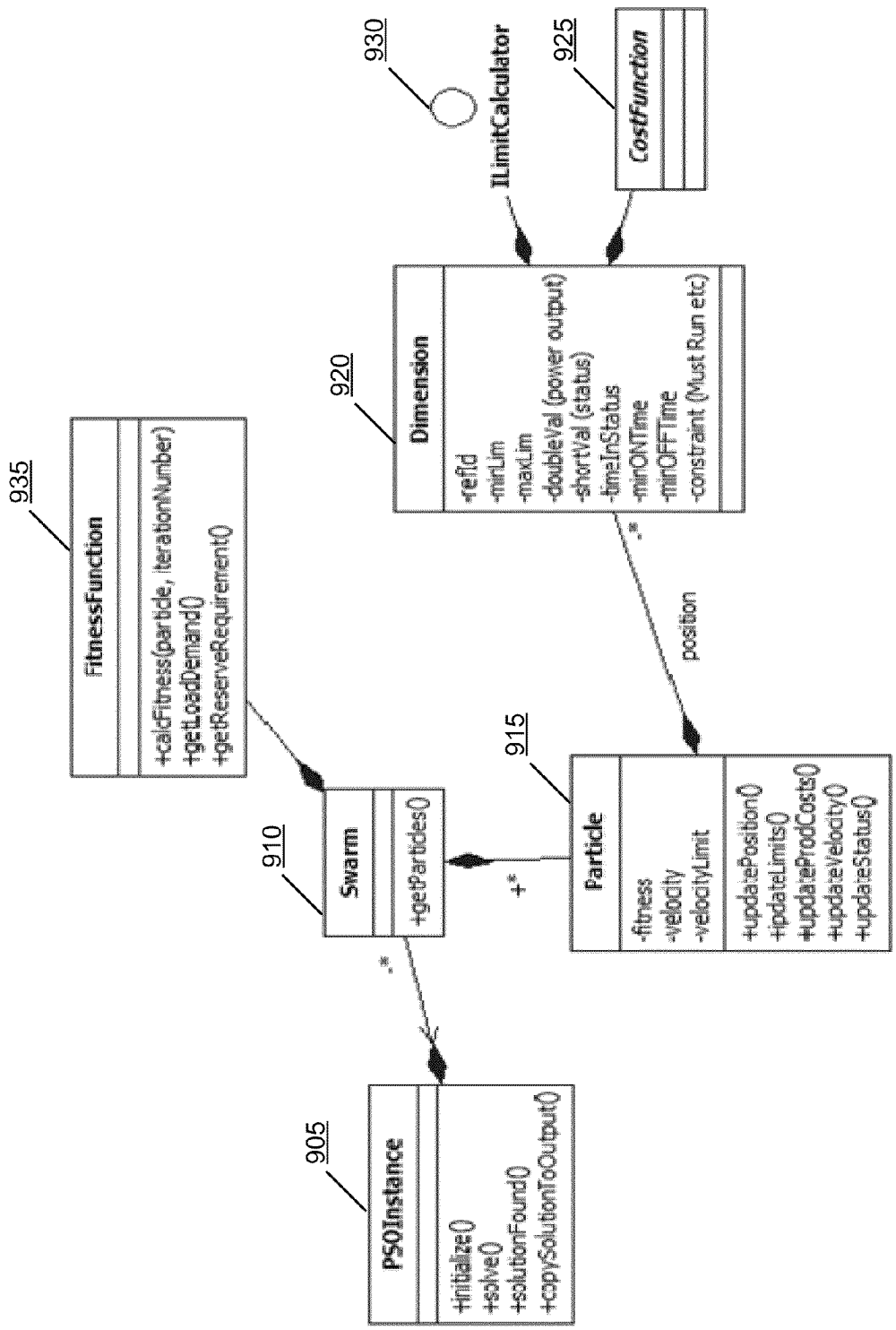
FIG. 9 is a simplified block diagram illustrating an example class hierarchy for a particle swarm optimization (PSO) algorithm implementation, according to one embodiment.

FIG. 9 illustrates an example class hierarchy for an example software implementation of a particle swarm optimization algorithm. In the embodiment illustrated, class PSOInstance 905 includes various methods, such as an initialize( ) method and a solve( ) method, discussed below. ARS module can generate (or instantiate) an object of class PSOInstance 905 for each distributed resource scheduling problem that ARS module is solving. PSOInstance class 905 includes a swarm class 910, where a PSOInstance object (e.g., an instantiated object of PSOInstance class 905) can include multiple swarm objects (e.g., multiple instantiated objects of swarm class 910). Swarm class 910 includes particle class 915, where a swarm object can include multiple particle objects. Particle class 915 also includes various functions that are discussed below. Particle class 915 also includes FitnessFunction class 935, which provides functions used to evaluate fitness of a swarm object (where the swarm object includes multiple particle objects, and fitness of a swarm object is determined from fitness of the particle objects). Particle class 915 includes dimension class 920, which in turn includes CostFunction class 925 and ILimitCalculator interface 930.

ARS module is triggered to execute by a caller, which invokes the method GenerationSchedulingObject.performGenerationScheduling(executionTime). In response, ARS module (or pre-processing module of the ARS module) builds a GenerationSchedulingProblem object, which includes data for the optimization process. This object also has a placeholder for the output from the algorithm (e.g., the PSO algorithm). The GenerationSchedulingProblem object implements an IProblem interface, so that the specific implementation can be isolated from the algorithm used. The only link between the GenerationSchedulingProblem and the algorithm used is the GenUnit class.

Figure 11:
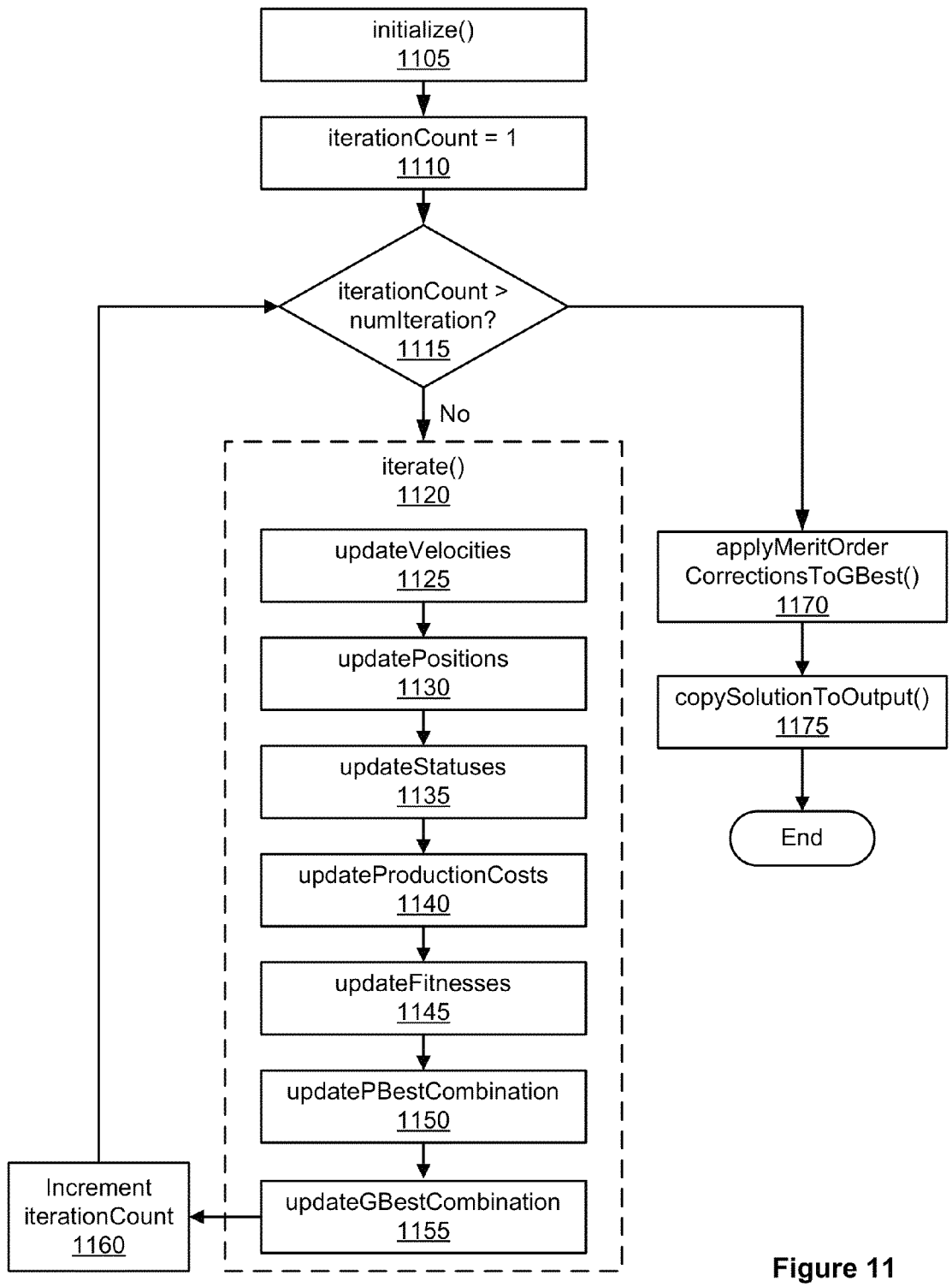
FIG. 11 is a simplified block diagram illustrating an example calling procedure by a PSO algorithm software implementation, according to one embodiment.

ARS module (or pre-processing module of the ARS module) then calls a solveSchedulingProblem( ) method, which creates a PSOConfiguration object and a PSOInstance object for a particular distributed resource scheduling problem that ARS module is solving. PSOConfiguration object provides configuration parameters to the PSO algorithm. PSOInstance represents an instance of a problem that is being solved by the PSO algorithm. PSO monitoring can also be set up, if debugging is enabled. The solveSchedulingProblem( ) method then calls PSOInstance.solve( ) method, which is illustrated in FIG. 11. A PSO monitor included in the ARS module (or optimization module of the ARS module) is configured to monitor each iteration of the PSO algorithm during execution of the solve( ) method and stores the local best ("pbest") of each particle and global best ("gbest") of the swarm in PSOInstance, such as in csv files in an ARS module home folder associated with the PSOInstance (e.g., in $MICROGRID_HOME folder). If a solution is found during execution of the solve( ) method, post-processing is performed on the solution.

The solve( ) method first calls an initialize( ) method 1105. The initialize( ) method creates the swarms (one swarm for each time interval). The swarms are created such that each set of particles (e.g., each swarm illustrated in FIG. 6B) forms a feasible solution. In some cases, it is possible that a feasible solution may not be found. In such a case, PSO algorithm may attempt to solve the problem again, using a modified set of initial conditions produced by modifying the original set of initial conditions by forced initialization, further discussed below.

A particle generator generates particles for one swarm at a time by calling a generateParticles( ) method. Because of this, it cannot effectively enforce the minimum up and down time of the DERs, which depends on the state of multiple swarms. The particle generator assumes that the initial condition is already a feasible solution (e.g., the initial condition or initial operating status of the DERs does not violate any constraints). The ParticleGenerator.generateParticles( ) method follows two policies depending on whether configuration parameter "Optimization.GenerationScheduling.forcedInitialization" is set or not. If the forced initialization parameter is not set (e.g., the forced initialization policy is not selected), the initial condition is carried forward with as minimal change as possible. For example, if the load is 700 kW at initial time interval $t_0$, and the load is 800 kW at next time interval $t_1$, the initialization will first generate a particle that is identical to the initial condition. This generated particle will have total output of 700 kW. The 100 kW that is needed additionally will be distributed to all online generators in proportion to their available capacities (e.g., pmax−pout, or maximum operating limit minus power output)." In this example, the forced initialization policy requires that enough capacity exists in the network to satisfy load plus reserve. If the particle generator finds that the capacity is not enough, the particle generator can change the initial conditions by turning on an available resource. The first available resource is a resource that is presently offline, is not associated with a user constraint that indicates the resource should not be turned on, and has satisfied its minimum down time. Thus, the particle generator first generates a particle that is identical to a corresponding particle in a previous time interval (or initial condition), and then ensures that the network has enough capacity to meet the required load in the current time interval, and then ensures load balance.

The initialize( ) method has a policy not to decommit any DER because such action could cause problems should that DER be needed again in (near) future intervals where load may be higher and the DER's minimum down time has not yet been satisfied. However, this policy may result in excessive generation that cannot be reduced and can cause power imbalance.

If the forced initialization parameter is set (e.g., the forced initialization policy is selected), all DERs are turned online and only the load balance is obtained. This policy can give good solutions when there are few DERs and most of the power is supplied through the grid tie. While initialization can be made more optimal, caution should be taken to avoid making initialization too complex (which can increase the time needed to complete performance of the PSO algorithm), especially in a case where such complexity does not improve the chances for finding a feasible solution.

There are situations when the particle generator may not be able to generate a feasible solution, such as in the following situations:

TABLE 5

| Infeasibility situations | |
| --- | --- |
| User instructions cause infeasibility | For example, a user instructed a DER to be off or on for a certain amount of time, even though the minimum up time or minimum down time cannot be satisfied. |
| Minimum load too small | The initialization may encounter a situation where the sum of minimum output of all online DERs is greater than the area load. |
| Minimum load too large | The initialization may encounter a situation where the sum of maximum outputs of all available DERs is insufficient to meet load balance requirements. |

After the particles are generated, the initialize( ) method determines the fitness of the generated particles, which will be used later to find a global best (or gBest) for the swarm. The initialize( ) method also initializes the local best (or pBest) particle combination. Initially, the particles at initial positions of a swarm are initialized as the pBest particles (e.g., no other solution is available to compare with the particles). Similarly, a global best (or gBest) particle combination can also be initialized to the best of the pBest particle combination.

Fitness of each particle is calculated by the calcFitness( ) method of fitness function 935. It should be noted that the fitness of one particle is not of great importance. Rather, the fitness of all particles that correspond to a swarm together determine the total fitness of a prospective solution (e.g., the fitness of a prospective solution is effectively compared against the fitness of all particles to find the minimal cost solution). Although the fitness is calculated for each particle, there is one fitness function object for the entire swarm, because the reserve and load balance constraints are the same for the whole swarm.

The solve( ) method then calls a set of methods that perform the PSO algorithm. The set of methods are called for each iteration of the PSO algorithm (e.g., the set of methods are called by an iterate( ) method 1120 for each iteration 1 through total iteration number numIteration of the PSO algorithm, where an iterationCount tracks the number of iterations performed). The following methods are included in Particle class 915 and are performed in response to determining iterationCount is not less than numIteration (e.g., iterationCount has not yet reached the total numIteration). Swarm class 910 provides similar methods, where the swarm methods simply call the corresponding method on all particles in that swarm.

The iterate( ) method 1120 (of the solve( ) method) includes the following methods:

updateVelocity( )

The Particle.updateVelocity( ) method implements a core algorithm statement (e.g., a first method used to implement the PSO algorithm) to calculate a new velocity based on learning factors and global and local best positions. The updateVelocity( ) method is called for each particle (and is referred to as updateVelocities 1125 in FIG. 11, indicating velocities for multiples particles are calculated). The velocities are initially randomly generated within the velocity limits. The velocity limit is specified in the configuration parameters file (e.g., config.xml file).

updatePosition( )

The Particle.updatePosition( ) method implements the second core algorithm statement (e.g., a second method used to implement the PSO algorithm) to calculate a new position for a particle, using the old (or previous) position of the particle and the new velocity calculated by updateVelocities 1125 in FIG. 11. New positions can be calculated by updatePosition( ) for each particle in a swarm (and is referred to as updatePositions 1130 in FIG. 11, indicating positions for multiple particles are calculated).

ensureLoadBalance( )

After the positions are updated, the ensureLoadBalance( ) method can be called to ensure load balance. The ensureLoadBalance( ) method is a destructive method that acts counter to the PSO algorithm by moving the particle(s) to satisfy the required load. If the particles are moved in a beneficial direction (e.g., move particles a minimal distance away from the optimal solution), the solution is not impacted adversely, but this method does have potential to cause trouble (e.g., move particles a large distance away from the optimal solution). The current policy uses average full load production cost in each time interval to give preference to increase or decrease generation of a DER. In most cases, ensureLoadBalance( ) only moves a single particle. Load balancing can be avoided completely (e.g., ensureLoadBalance( ) method is not called) by instead imposing a penalty on load balance violations. However, such a configuration has been found to only work for problems involving a few time intervals (e.g., up to 3 time intervals for the dispatch horizon). As the number of time intervals increases in such a configuration, PSO accuracy quickly falls.

updateLimits( )

The updateLimits( ) method calculates the state of charge (SOC) for energy storage resources. This method also determines new limits based on the SOC (the limit calculator determines new limits outside of the algorithm).

updateStatus( )

Once the position of a particle is determined, the updateStatus( ) method can determine the status of one or more DERs associated with a particle (where each DER corresponds to a dimension of the problem space in which the particle is located), where the position of the particle can indicate the status (e.g., power output) of one or more DERs. New statuses can be calculated by updateStatus( ) for each particle in a swarm (and is referred to as updateStatuses 1135 in FIG. 11). Any DER that is scheduled to produce less than the minimum economic limit is assumed to be offline. In some embodiments, resources that have a minimum operating limit of zero (and thus is online while producing zero output) may cause problems with an implementation of a minimum economic limit of zero (where the DER is producing zero output and is assumed to be offline). Thus, in some embodiments, the minimum operating limit can be set to a non-zero minimum limit (such as 0.001) in order to use a minimum economic limit of zero determine which DERs are offline.

updateProductionCosts( )

The updateProductionCosts( ) method 1140 forwards a call to each dimension (e.g., representing a DER) of a particle, which in turn uses its cost function to update the production cost. However, the "real" cost for operation of storage resources is different from the cost for operation of generation resources, due to the cost of energy lost in conversion (e.g., converting generated power to stored energy). To calculate the "real" production cost for storage resources, an amplification factor is used for storage resources when calculating the production cost.

updateFitnesses( )

The updateFitnesses( ) method 1145 determines fitness of a swarm, where production cost is a portion of particle fitness. The fitness equals the production cost plus any constraint violation penalties. When no constraint is violated, the particle fitness is same as the production cost. This method forwards the call to the FitnessFunction of the corresponding swarm to get the fitness of the particle.

updatePBestCombination( )

Once the fitness is determined, the updatePBestCombination( ) method 1150 checks if a new pBest (particle best or local best) for a particle combination has been found. If found, pBest is updated with the combination. As explained earlier, the individual particle fitness is of little importance. Rather, the fitness of all corresponding particles in all time intervals should be considered because the optimization objective is to minimize the cost over a dispatch horizon and not in a particular time interval.

updateGBestCombination( )

The updateGBestCombination( ) method 155 checks to see if a better global best for a particle combination has been found. If found, gBest is updated with the combination. The iterationCount can then be incremented, and iterate( ) method 1120 can be called again if the total number of iterations (e.g., numIteration) has not been met. If the total number of iterations has been met, a merit order method can be called.

The updateGBestCombination( ) method can also set a "solution found" Boolean value. In case of PSO, there is no deterministic way to tell whether or not a solution was found. Instead, a solution is determined to be found when the given solution is better than an initial random solution. Additionally, this method checks to see if any constraint has been violated. If any constraint is violated, it can be assumed that no solution was found.

applyMeritOrderCorrectionsToGBest( )

The accuracy of the PSO varies widely depending upon the initialization method used and the mix of DERs. While suboptimal solutions cannot always be detected, the sub-optimal output levels of the DERs (except storage resources) can be corrected using a merit order method (in the absence of the ramp rate constraint). The applyMeritOrderCorrectionsToGBest( ) method 1170 applies a heuristic correction to the final (sub-optimal) solution to smooth the rough edges by tweaking particle positions (that are already load balanced) to provide the most economical output levels, without disturbing the load balance. The DERs are sorted by the incremental cost (e.g., in ascending or descending order) and the most expensive DER is lowered by a configured heuristics step size, while the least expensive DER is raised by the same amount, only until some cost savings are obtained. Although accuracy depends upon the configured step size to some extent, this method is capable of pushing the resources to its upper or lower limits, irrespective of the heuristic step size. Also, the heuristic step size can be dynamically modified, based on "inflection points" of the segmented cost curve, which further improves accuracy of PSO.

copySolutionToOutput( )

Finally, copySolutionToOutput( ) method 1175 copies the solution from the algorithm to output attributes of the GenUnit (GenUnit objects are contained in the GenerationSchedulingProblem object), so that the caller can retrieve the output.

An Example Computing and Network Environment

As shown above, the present invention can be implemented using a variety of computer systems and networks. An example of one such computing and network environment is described below with reference to FIGS. 12 and 13.

Figure 12:
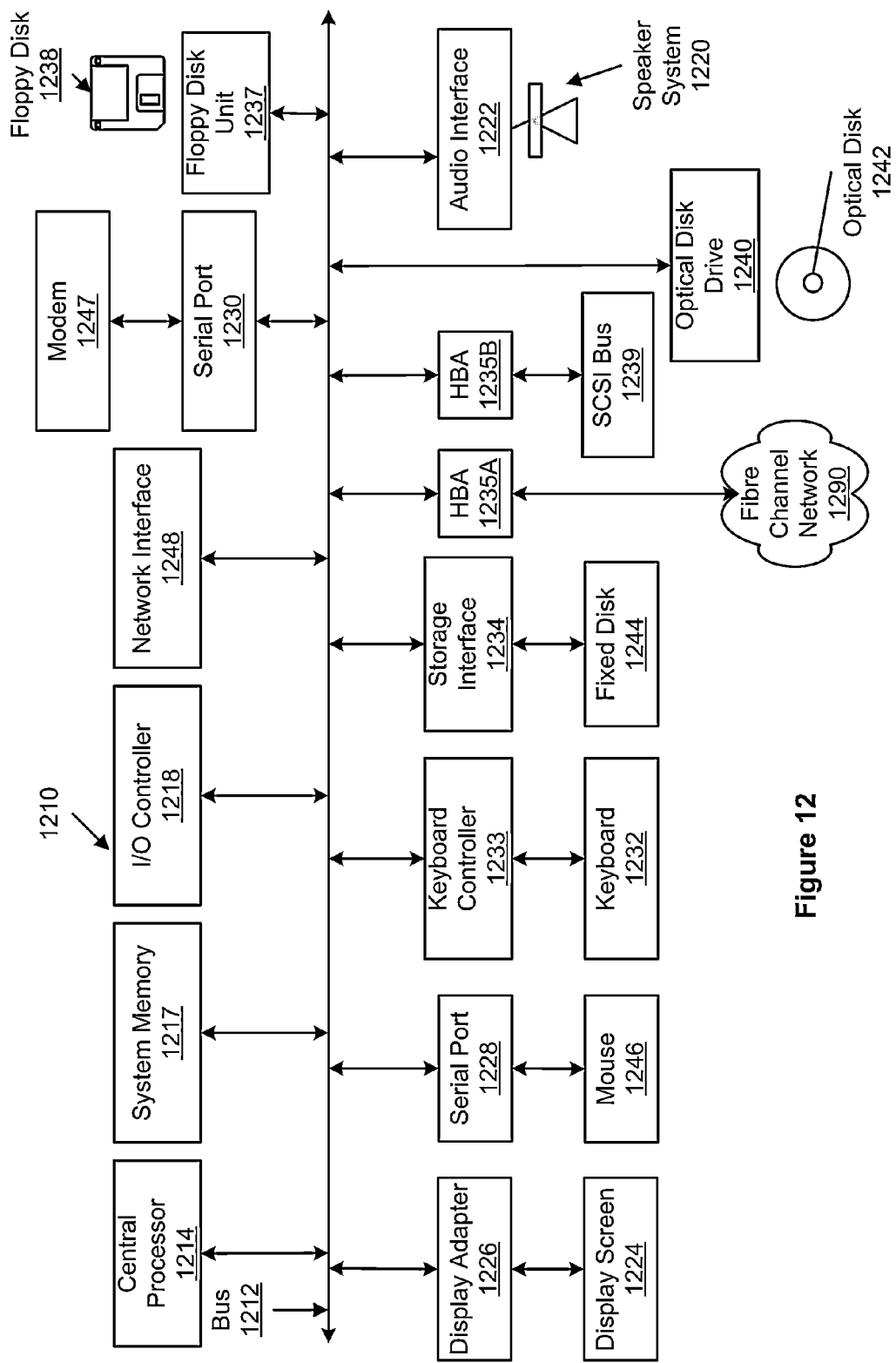
FIG. 12 is a simplified block diagram of a computer system suitable for implementing aspects of the present disclosure, according to one embodiment.

FIG. 12 depicts a block diagram of a computer system 1210 suitable for implementing aspects of the present invention (e.g., clients 110 and/or server 120). Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer-readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present invention. The devices and subsystems can be interconnected in different ways from that shown in FIG. 12. The operation of a computer system such as that shown in FIG. 12 is readily known in the art and is not discussed in detail in this application. Code to implement the present invention can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
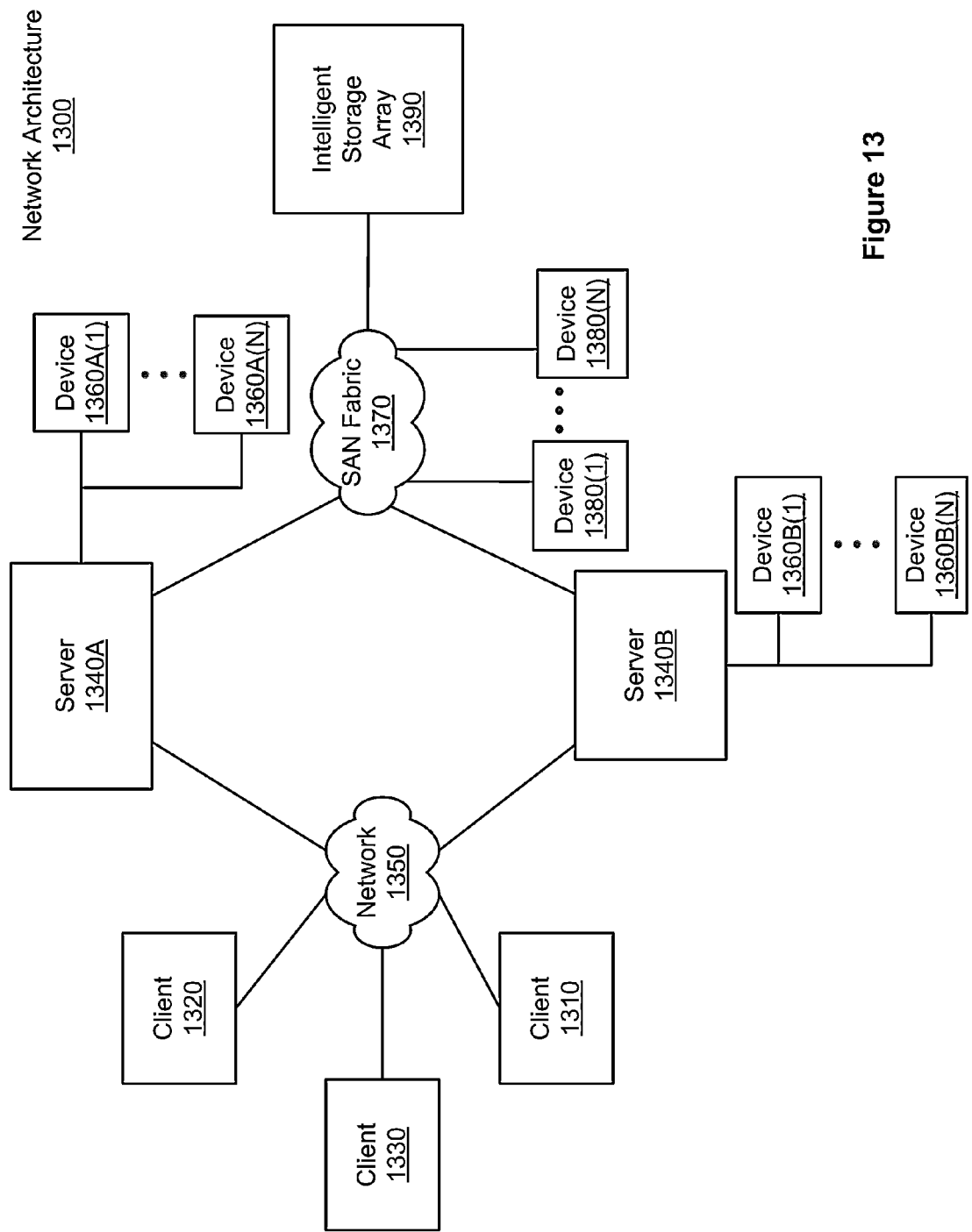
FIG. 13 is a simplified block diagram of a network architecture suitable for implementing aspects of the present disclosure, according to one embodiment.

FIG. 13 is a block diagram depicting a network architecture 1300 in which client systems 1310, 1320 and 1330, as well as storage servers 1340A and 1340B (any of which can be implemented using computer system 1210), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation of the invention. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method performed by a computer system for generating a resource schedule, the method comprising:
   automatically generating a resource schedule for a set of resources in a distribution network, wherein the automatically generating comprises
      determining a solution using a particle swarm optimization technique,
      the resource schedule is automatically generated using the solution,
      the solution indicates calculated power output levels for the set of resources in the distribution network, and
      the calculated power output levels of the set of resources, in aggregate, satisfy a power demand placed on the distribution network; and
   deriving operating statuses of the set of resources from the calculated power output levels of the set of resources, wherein
      if a calculated power output level falls within threshold power output levels, a corresponding operating status is derived to be online, and
      if the calculated power output level falls outside the threshold power output levels, the corresponding operating status is derived to be offline.

2. The method of claim 1, wherein the determining the solution further comprises:
   determining an operating status of each of the set of resources;
   initializing a particle swarm to initial conditions, wherein the initial conditions are based on the operating status of each of the set of resources; and
   solving an objective function for the solution, using the particle swarm, wherein
      the objective function represents a total production cost incurred by the set of resources.

3. The method of claim 2, further comprising:
   determining whether the solution is feasible; and
   in response to a determination that the solution is not feasible,
      determining modified initial conditions of the particle swarm,
      re-initializing the particle swarm to the modified initial conditions, and
      re-solving the objective function for a second solution, using the particle swarm.

4. The method of claim 3, wherein the determining modified initial conditions comprises:
   changing an initial operating status of a first resource of the set of resources to a modified operating status.

5. The method of claim 4, wherein
the initial operating status indicates the first resource is offline, and
the modified operating status indicates the first resource is online.

6. The method of claim 1, further comprising:
building an objective function, wherein
the set of resources comprises a plurality of power generation devices and a plurality of energy storage devices,
the objective function represents a total production cost incurred by the plurality of power generation devices and by the plurality of energy storage devices, and
the particle swarm optimization technique minimizes the total production cost over a dispatch horizon.

7. The method of claim 6, wherein
the objective function is subject to operating constraints of the plurality of power generation devices and the plurality of energy storage devices.

8. The method of claim 1, further comprising:
determining a load profile of the distribution network, wherein the load profile indicates the power demand placed on the distribution network.

9. A non-transitory computer-readable storage medium configured to store program instructions that, when executed on a processor, are configured to cause the processor to at least perform:
automatically generating a resource schedule for a set of resources in a distribution network, wherein the automatically generating comprises
determining a solution using a particle swarm optimization technique,
the resource schedule is automatically generated using the solution, the solution indicates calculated power output levels for the set of resources in the distribution network, and
the calculated power output levels of the set of resources, in aggregate, satisfy a power demand placed on the distribution network; and
deriving operating statuses of the set of resources from the calculated power output levels of the set of resources, wherein
if a calculated power output level falls within threshold power output levels, a corresponding operating status is derived to be online, and
if the calculated power output level falls outside the threshold power output levels, the corresponding operating status is derived to be offline.

10. The non-transitory computer-readable storage medium of claim 9, wherein the determining the solution further comprises:
determining an operating status of each of the set of resources;
initializing a particle swarm to initial conditions, wherein
the initial conditions are based on the operating status of each of the set of resources; and
solving an objective function for the solution, using the particle swarm, wherein
the objective function represents a total production cost incurred by the set of resources.

11. The non-transitory computer-readable storage medium of claim 10, wherein the method further comprises:
determining whether the solution is feasible; and
in response to a determination that the solution is not feasible,
determining modified initial conditions of the particle swarm,
re-initializing the particle swarm to the modified initial conditions, and
re-solving the objective function for a second solution, using the particle swarm.

12. The non-transitory computer-readable storage medium of claim 9, wherein the method further comprises:
building an objective function, wherein
the set of resources comprises a plurality of power generation devices and a plurality of energy storage devices,
the objective function represents a total production cost incurred by the plurality of power generation devices and by the plurality of energy storage devices, and
the particle swarm optimization technique minimizes the total production cost over a dispatch horizon.

13. An apparatus comprising:
a processor; and
a memory coupled to the processor and configured with stored instructions executable by the processor, the instructions when executed by the processor cause the processor to:
automatically generate a resource schedule for a set of resources in a distribution network, wherein
the instructions are further configured to
determine a solution using a particle swarm optimization technique,
the resource schedule is automatically generated using the solution,
the solution indicates calculated power output levels for the set of resources in the distribution network, and
the calculated power output levels of the set of resources, in aggregate, satisfy a power demand placed on the distribution network; and
derive operating statuses of the set of resources from the calculated power output levels of the set of resources, wherein
if a calculated power output level falls within threshold power output levels, a corresponding operating status is derived to be online, and
if the calculated power output level falls outside the threshold power output levels, the corresponding operating status is derived to be offline.

14. The apparatus of claim 13, wherein the instructions further include instructions that when executed by the processor cause the processor to:
determine an operating status of each of the set of resources;
initialize a particle swarm to initial conditions, wherein
the initial conditions are based on the operating status of each of the set of resources; and
solve an objective function for the solution, with use of the particle swarm, wherein
the objective function represents a total production cost incurred by the set of resources.

15. The apparatus of claim 14, wherein the instructions further include instructions that when executed by the processor cause the processor to:
determine whether the solution is feasible; and
in response to a determination that the solution is not feasible,
determine modified initial conditions of the particle swarm,
re-initialize the particle swarm to the modified initial conditions, and
re-solve the objective function for a second solution, with use of the particle swarm.

16. The apparatus of claim 13, wherein the instructions further include instructions that when executed by the processor cause the processor to:
- build an objective function, wherein
  - the set of resources comprises a plurality of power generation devices and a plurality of energy storage devices,
  - the objective function represents a total production cost incurred by the plurality of power generation devices and by the plurality of energy storage devices, and
  - the particle swarm optimization technique minimizes the total production cost over a dispatch horizon.

* * * * *